United States Patent
Nakao et al.

(10) Patent No.: US 11,470,602 B2
(45) Date of Patent: *Oct. 11, 2022

(54) WIRELESS COMMUNICATION APPARATUS AND CHANNEL ALLOCATION METHOD

(71) Applicant: Sun Patent Trust, New York, NY (US)

(72) Inventors: Seigo Nakao, Osaka (JP); Akihiko Nishio, Osaka (JP); Daichi Imamura, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,105

(22) Filed: Feb. 4, 2021

(65) Prior Publication Data

US 2021/0160833 A1    May 27, 2021

Related U.S. Application Data

(63) Continuation of application No. 16/851,027, filed on Apr. 16, 2020, now Pat. No. 11,160,068, which is a
(Continued)

(30) Foreign Application Priority Data

| Aug. 8, 2008 | (JP) | 2008-205644 |
| Oct. 31, 2008 | (JP) | 2008-281390 |
| Dec. 25, 2008 | (JP) | 2008-330641 |

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1822* (2013.01); *H04L 5/001* (2013.01);
(Continued)

(58) Field of Classification Search
None
See application file for complete search history.

(56) References Cited

U.S. PATENT DOCUMENTS

| 8,428,016 B2 | 4/2013 | Bhattad et al. |
| 8,446,870 B2 * | 5/2013 | Nakao ............... H04L 1/1822 455/450 |

(Continued)

FOREIGN PATENT DOCUMENTS

| CN | 1451251 A | 10/2003 |
| EP | 1 531 576 A2 | 5/2005 |

(Continued)

OTHER PUBLICATIONS

Berggren, Frank, "[LTE-Advanced] Support for wider bandwidth," Email regarding 3GPP Archive, Oct. 17, 2008, 3 pages.
(Continued)

*Primary Examiner* — Mohammad S Adhami
(74) *Attorney, Agent, or Firm* — Seed IP Law Group LLP

(57) ABSTRACT

Disclosed is a base station in which the frequency usage efficiency can be improved when the communication bandwidths are asymmetric in the uplink line and the downlink line. A base station can communicate by using a plurality of downlink unit bands and a smaller number of uplink unit bands. A control unit allocates uplink resource allocation information and downlink resource allocation information to a PDCCH which is arranged in each of the plurality of downlink unit bands, and allocates a response signal to the uplink line data to a PHICH which is arranged in the same number of downlink unit bands from the plurality of downlink unit bands as there are uplink unit bands. A transmit RF unit transmits the resource allocation information or the response signal.

20 Claims, 13 Drawing Sheets

Related U.S. Application Data continuation of application No. 16/006,648, filed on Jun. 12, 2018, now Pat. No. 10,667,251, which is a continuation of application No. 15/714,873, filed on Sep. 25, 2017, now Pat. No. 10,039,092, which is a continuation of application No. 15/132,151, filed on Apr. 18, 2016, now Pat. No. 9,814,032, which is a continuation of application No. 14/930,285, filed on Nov. 2, 2015, now Pat. No. 9,345,020, which is a continuation of application No. 14/683,016, filed on Apr. 9, 2015, now Pat. No. 9,210,702, which is a continuation of application No. 13/866,877, filed on Apr. 19, 2013, now Pat. No. 9,036,587, which is a continuation of application No. 13/057,453, filed as application No. PCT/JP2009/003802 on Aug. 7, 2009, now Pat. No. 8,446,870.

(51) Int. Cl.
   *H04L 1/18* (2006.01)
   *H04W 4/06* (2009.01)

(52) U.S. Cl.
   CPC .......... *H04L 5/0023* (2013.01); *H04L 5/0055* (2013.01); *H04L 5/0094* (2013.01); *H04W 4/06* (2013.01); *H04W 72/0413* (2013.01); *H04W 72/0453* (2013.01)

(56) References Cited

U.S. PATENT DOCUMENTS

| | | | |
|---|---|---|---|
| 9,036,587 B2* | 5/2015 | Nakao | H04L 5/0094 455/450 |
| 9,210,702 B2* | 12/2015 | Nakao | H04L 5/0055 |
| 9,345,020 B2* | 5/2016 | Nakao | H04W 72/0413 |
| 9,374,208 B2 | 6/2016 | Lee et al. | |
| 9,814,032 B2* | 11/2017 | Nakao | H04L 5/001 |
| 10,039,092 B2* | 7/2018 | Nakao | H04L 5/0055 |
| 10,067,251 B2* | 9/2018 | Sdow | G01V 1/201 |
| 11,160,068 B2* | 10/2021 | Nakao | H04L 1/1822 |
| 2005/0201474 A1 | 9/2005 | Cho et al. | |
| 2006/0203779 A1 | 9/2006 | Attar et al. | |
| 2006/0221883 A1 | 10/2006 | Damnjanovic et al. | |
| 2006/0274712 A1 | 12/2006 | Malladi et al. | |
| 2006/0280142 A1 | 12/2006 | Damnjanovic et al. | |
| 2008/0247337 A1 | 10/2008 | Li et al. | |
| 2008/0287068 A1 | 11/2008 | Etemad | |
| 2009/0046793 A1 | 2/2009 | Love et al. | |
| 2009/0325626 A1 | 12/2009 | Palanki et al. | |
| 2011/0081856 A1 | 4/2011 | Johansson et al. | |
| 2011/0092242 A1 | 4/2011 | Parkvall et al. | |
| 2011/0111785 A1 | 5/2011 | Lindoff et al. | |
| 2011/0143796 A1 | 6/2011 | Lee et al. | |
| 2011/0194514 A1 | 8/2011 | Lee et al. | |
| 2011/0268071 A1 | 11/2011 | Slew et al. | |
| 2011/0305134 A1 | 12/2011 | Chung et al. | |
| 2012/0327890 A1 | 12/2012 | Kim et al. | |
| 2013/0178221 A1 | 7/2013 | Jung et al. | |

FOREIGN PATENT DOCUMENTS

| | | |
|---|---|---|
| EP | 1674455 A | 9/2005 |
| GB | 2 439 367 A | 12/2007 |
| JP | 2008-533828 A | 8/2008 |
| WO | 01/72080 A1 | 9/2001 |
| WO | 2006/096765 A1 | 9/2006 |
| WO | 2008/084422 A2 | 7/2008 |
| WO | 2009/119385 A1 | 10/2009 |

OTHER PUBLICATIONS

Dahlman et al., *3G Evolution: HSPA and LTE for Mobile Broadband*, 1st ed., Elsevier, 2007, 485 pages.
Ericsson, "Text Proposal for DC-HSDPA assumptions and standards impact," R1-082249, Agenda Item: 10, 3GPP TSG-RAN WG1 Meeting #53, Kansas City, MO, USA, May 5-9, 2008, 18 pages.
LG Electronics, "PHICH linkage to uplink transmissions," R1-080999, Agenda Item: 6.1.3, 3GPP TSG RAN WG1 #52, Sorrento, Italy, Feb. 11-15, 2008, 4 pages.
Panasonic, "Implicit assignment of PHICH," R1-080976, Agenda Item: 6.1.3, 3GPP TSG-RAN WG1 Meeting #52, Sorrento, Italy, Feb. 11-15, 2008, 3 pages.
Philips, NXP, "Discussion of Technologies for LTE-Advanced," R1-082533, Agenda Item: 12, 3GPP TSG RAN WG1 Meeting #53bis, Warsaw, Poland, Jun. 30-Jul. 4, 2008, 3 pages.
QUALCOMM Europe et al., "Further description of WCDMA based E-UTRA," R1-050908, Agenda Item: 10.7.2, 3GPP TSG-RAN WG1 #42, London, United Kingdom, Aug. 29-Sep. 2, 2005, 12 pages.
Texas Instruments, "Issues on Carrier Aggregation for Advanced E-UTRA," R1-083528, Agenda Item: 11, 3GPP TSG RAN WG1 54bis, Prague, Czech Republic, Sep. 29-Oct. 3, 2008, 6 pages.
3GPP TS 36.211 V8.3.0, "3rd Generation Partnership Project; Technical Specification Group Radio Access Network; Evolved Universal Terrestrial Radio Access (E-UTRA); Physical Channels and Modulation (Release 8)," May 2008, 77 pages.
3GPP TS 36.212 V8.3.0, "3rd Generation Partnership Project; Technical Specification Group Radio Access Network; Evolved Universal Terrestrial Radio Access (E-UTRA); Multiplexing and channel coding (Release 8)," May 2008, 48 pages.
3GPP TS 36.213 V8.3.0, "3rd Generation Partnership Project; Technical Specification Group Radio Access Network; Evolved Universal Terrestrial Radio Access (E-UTRA); Physical layer procedures (Release 8)," May 2008, 45 pages.
3GPP TR 36.913 V8.0.0, "3rd Generation Partnership Project; Technical Specification Group Radio Access Network; Requirements for Further Advancements for E-UTRA (LTE-Advanced) (Release 8)," Jun. 2008, 14 pages.
Ericsson, "Carrier aggregation in LTE-Advanced," R1-082468, TSG-RAN WG1 #53bis, Agenda Item: 12, Warsaw, Poland, Jun. 30-Jul. 4, 2008, 6 pages.
First Examination Report, dated Jun. 7, 2018, for the corresponding Indian Patent Application No. 8/MUMNP/2011, 5 pages.
Huawei, "Carrier aggregation in Advanced E-UTRA," R1-082448, 3GPP TSG RAN WG1#53bis, Agenda Item: 12, Study Item on LTE-Advanced, Warsaw, Poland, Jun. 30-Jul. 4, 2008, 4 pages.
Huawei, "DL/UL Asymmetric Carrier aggregation," R1-083706, Agenda Item: 11, 3GPP TSG-RAN-WG1 Meeting #54bis, Prague, Czech Republic, Sep. 29-Oct. 3, 2008, 4 pages.
Indian Examination Report dated Dec. 15, 2020, for the corresponding Indian Patent Application No. 201828024481, 5 pages.
International Search Report dated Nov. 10, 2009, for corresponding International Application No. PCT/JP2009/003802, 2 pages.
Nokia, Nokia Siemens Networks, "PHICH and mapping to PHICH groups," R1-080301, 3GPP TSG RAN WG1 Meeting #51bis, Agenda Item: 6.1.3 Downlink Control Signalling, Sevilla, Spain, Jan. 14-18, 2008, 5 pages.
NTT DoCoMo, Inc., "Proposals for LTE-Advanced Technologies," R1-082575, 3GPP TSG RAN WG1 Meeting #53bis, Agenda Item: 12, Warsaw, Poland, Jun. 30-Jul. 4, 2008, 36 pages.
Texas Instruments, "Enhancements for LTE-Advanced," R1-081979, Agenda Item: 6.2, 3GPP TSG RAN WG1 53, Kansas City, MO, USA, May 5-9, 2008, 13 pages.
ZTE, "Technical scope for LTE-advanced evolution," R1-082380, Jul. 2008, 12 pages.
Extended European Search Report, dated Nov. 15, 2017, for the related Patent Application No. 17182510.2-1857/3255947, 12 pages.
Samsung, "ACK/NACK signalling performance," Tdoc R1-040688, 3GPP TSG-RAN WG1 Rel-6 Ad Hoc, Agenda item 6.4, Cannes, France, Jun. 21-24, 2004, 3 pages.

* cited by examiner

WIRELESS COMMUNICATION APPARATUS AND CHANNEL ALLOCATION METHOD

BACKGROUND

Technical Field

The present invention relates to a radio communication base station apparatus, radio communication terminal apparatus and channel assignment method.

Description of the Related Art

In 3GPP-LTE, an OFDMA (Orthogonal Frequency Division Multiple Access) is adopted as a downlink communication scheme. In a radio communication scheme adopting 3GPP LTE, a radio communication base station apparatus (hereinafter simply "base station") transmits a synchronization channel ("SCH") and broadcast channel ("BCH") using predetermined communication resources. Then, first, a radio communication terminal apparatus (hereinafter simply "terminal") secures synchronization with the base station by capturing the SCH. After that, the terminal obtains parameters unique to the base station (such as a frequency bandwidth) by reading BCH information (see Non-Patent Literatures 1, 2 and 3).

Also, in 3GPP LTE, HARQ (Hybrid Automatic Repeat reQuest) is applied to uplink data transmitted from the terminal to the base station in uplink. In HARQ, the base station performs CRC (Cyclic Redundancy Check) detection of uplink data and feeds back an ACK (Acknowledgement) if CRC=OK (no error) or a NACK if CRC=NG (error present), to a mobile station as a response signal. These response signals are transmitted via a physical channel for downlink response signal transmission such as PHICH (Physical Hybrid-ARQ Indicator Channel).

Also, standardization of 3GPP LTE-advanced, which realizes faster communication than 3GPP LTE, has been started (see Non-Patent Literature 4). The 3GPP LTE-advanced system (hereinafter "LTE+ system") follows the 3GPP LTE system (hereinafter "LTE system").

CITATION LIST

Non-Patent Literature

[NPL 1] 3GPP TS 36.211 V8.3.0, "Physical Channels and Modulation (Release 8)," May 2008

[NPL 2] 3GPP TS 36.212 V8.3.0, "Multiplexing and channel coding (Release 8)," May 2008

[NPL 3] 3GPP TS 36.213 V8.3.0, "Physical layer procedures (Release 8)," May 2008

[NPL 4] 3GPP TR 36.913 V8.0.0, "Requirements for Further Advancements for E-UTRA (LTE-Advanced) (Release 8)," June 2008

SUMMARY

Technical Problem

In 3GPP LTE-advanced, to realize downlink transmission speed equal to or greater than maximum 1 Gbps, it is expected to adopt a base station and terminal that can perform communication in a wideband frequency equal to or greater than 40 MHz. Also, in 3GPP LTE-Advanced, communication bandwidths may be made asymmetric between uplink and downlink, taking into account the difference between a throughput request for uplink and a throughput request for downlink. To be more specific, in 3GPP LTE-Advanced, the downlink communication bandwidth may be made wider than the uplink communication bandwidth.

Here, a base station supporting the LTE+ system (hereinafter "LTE+ base station") is designed to be able to perform communication using a plurality of "component bands." Here, a "component band" is a band having a maximum 20 MHz width, and is defined as a reference unit of a communication band. Further, a "component band" in downlink (hereinafter "downlink component band") may be defined as a band divided by downlink frequency band information in a BCH broadcasted from a base station or a band defined by bandwidth in a case where a physical downlink control channel (PDCCH) is placed in the frequency domain in a distributed manner. Also, a "component band" in uplink (hereinafter "uplink component band") may be defined as a band divided by uplink frequency band information in a BCH broadcasted from a base station or a reference unit in a communication band equal to or below 20 MHz including a PUCCH at both end parts. Also, a "component band" may be expressed as "component carrier(s)" in English in 3GPP LTE.

An LTE+ base station supports an LTE+ system support terminal (hereinafter "LTE+ terminal"). LTE+ terminals include a terminal that can perform communication using only one component band (hereinafter "type-1 LTE+ terminal") and a terminal that can perform communication using a plurality of component bands (hereinafter "type-2 LTE+ terminal"). Also, the LTE+ base station needs to support not only the above LTE+ terminal but also a terminal that supports the LTE system and that can perform communication using only one component band (hereinafter "LTE terminal"). That is, the LTE+ system is designed to be able to assign a plurality of component bands to single communication, and follows the LTE system in which single communication is independently assigned to each component band.

FIG. 1 and FIG. 2 show an example of placing channels in the LTE+ system in which communication bandwidths (i.e., the numbers of component bands) are asymmetric between uplink and downlink. In FIG. 1 and FIG. 2, in the LTE+ system, the downlink communication bandwidth is 40 MHz including two downlink component bands, and the uplink communication bandwidth is 20 MHz including one uplink component band.

In the downlink shown in the upper part of FIG. 1, PHICH's and PDCCH's are placed over component bands 1 and 2 in a distributed manner. Also, an SCH that can be received by the LTE terminal and LTE+ terminal (hereinafter simply "SCH") and a BCH that can be received by the LTE terminal and LTE+ terminal (hereinafter simply "BCH") are placed near the center frequencies of downlink component bands 1 and 2. Also, as shown in the lower part of FIG. 1, a physical uplink data channel ("PUSCH") is placed in the whole uplink component band in a distributed manner, and a PUCCH is placed in both sides of the PUSCH. Also, downlink component bands 1 and 2 are associated with one uplink component band. For example, in a case where communication is performed using only one component band, even when either of two mutually-different downlink component bands 1 and 2 is used as downlink, the same uplink component band is used as uplink.

Also, an LTE+ base station assigns a response signal for uplink data, which is placed in a PUSCH and then transmitted, to a PHICH, and feeds back the result to a terminal. Here, for example, the PHICH resource number indicating the PHICH resource position is defined in association with the PUSCH resource block ("RB") number. That is, the PHICH resource numbers of PHICH's in component bands 1 and 2 shown in FIG. 1 are associated with respective PUSCH RB numbers.

Also, each terminal receives a response signal assigned to a PHICH placed in the same downlink component band as that of a PDCCH to which resource allocation information for that terminal is assigned. Then, the terminal finds the PHICH resource number of the PHICH to which the response signal for uplink data is assigned, from the RB number of a PUSCH to which the uplink data is assigned. For example, as shown in FIG. 1, when resource allocation information for the subject terminal is assigned to the PDCCH placed in downlink component band 1, this terminal receives as response signal assigned to the PHICH placed in downlink component band 1. On the other hand, as shown in FIG. 1, when resource allocation information for the subject terminal is assigned to the PDCCH placed in downlink component band 2, this terminal receives a response signal assigned to the PHICH placed in downlink component band 2.

However, in FIG. 1, if one of PHICH's in downlink component band 1 and 2 associated with the same PUSCH (the same RB number) is used, the other PHICH is not used. That is, PHICH's associated with the same PUSCH (the same RB number) are redundantly placed in downlink component bands 1 and 2. Therefore, only a half of resources for PHICH's placed in downlink component bands 1 and 2 is probabilistically used, and, consequently, the overhead of PHICH resources increases. Therefore, with the PHICH and PDCCH placement shown in FIG. 1, the use efficiency of frequency degrades.

In contrast, with the downlink shown in FIG. 2, a PHICH and PDCCH are placed only in one downlink component band.

In FIG. 2, the downlink includes a downlink component band in which an LTE terminal and LTE+terminal can perform communication (hereinafter "LTE/LTE+ coexisting band") and a downlink component band in which only the LTE+terminal can perform communication (hereinafter "LTE+ band"). An SCH/BCH is placed in the LTE/LTE+ coexisting band, and both the LTE terminal and the LTE+ terminal can access an LTE+ base station in the LTE/LTE+ coexisting band. In contrast, in the LTE+ band, the SCH/BCH that can be received by the LTE terminal is not placed, and a physical downlink shared channel ("PDSCH") is placed.

Therefore, the LTE terminal and LTE+ terminal receive resource allocation information assigned to a PDCCH placed in the LTE/LTE+ coexisting band, and receive a response signal assigned to a PHICH placed in the LTE/LTE+ coexisting band. Here, even in a case of using the LTE/LTE+ coexisting band and LTE+ band shown in FIG. 2, the type-2 LTE+ terminal that can perform communication using a plurality of component bands uses the PDCCH and PHICH placed in the LTE/LTE+ coexisting band.

According to the placement example shown in FIG. 2, a PHICH is not placed in the LTE+ band, and, consequently, resources that can be used as a PDSCH increase compared to FIG. 1.

However, in FIG. 2, although resources for a PDSCH placed in the LTE+ band increase, a PDCCH required to allocate a PDSCH to each terminal is placed only in the LTE/LTE+ coexisting band. Therefore, the amount of PDCCH resources is not sufficient; PDSCH's cannot be assigned efficiently, and, consequently, there is a high possibility that the use efficiency of PDSCH's degrades. Therefore, even with the PHICH and PDCCH placement shown in FIG. 2, the use efficiency of frequency degrades.

Thus, if communication bandwidths (the numbers of bands) are made asymmetric between uplink and downlink, the use efficiency of frequency may degrade depending on PHICH and PDCCH placement.

Therefore embodiments of the present invention provide a base station, terminal and channel assignment method for improving the use efficiency of frequency in a case where communication bandwidths are asymmetric between uplink and downlink.

Solution to Problem

The base station of the present invention, which is a radio communication base station apparatus that can perform communication using a plurality of downlink component bands and a smaller number of uplink component bands than the plurality of downlink component bands, employs a configuration having: a control section that assigns resource allocation information to a first channel placed in each of the plurality of downlink component bands and assigns a response signal for uplink data to a second channel placed in a same number of partial downlink component bands as the uplink component bands; and a transmitting section that transmits the resource allocation information or the response signal.

The terminal of the present invention, which is a radio communication terminal apparatus that can perform communication using a plurality of downlink component bands and a smaller number of uplink component bands than the plurality of downlink component bands, employs a configuration having: an obtaining section that obtains resource allocation information for the radio communication terminal apparatus assigned to a first channel placed in each of the plurality of downlink component bands; a mapping section that maps uplink data on the uplink component bands according to the resource allocation information of uplink data; and an extracting section that extracts a response signal for the uplink data from a second channel placed in a same number of partial downlink component bands as the uplink component bands.

The channel assignment method of the present invention for assigning a second channel to a response signal for uplink data in the radio communication base station apparatus that can perform communication using a plurality of downlink component bands and a smaller number of uplink component bands than the plurality of downlink component bands, includes: assigning resource allocation information to a first channel placed in each of the plurality of downlink component bands; and assigning a response signal for the uplink data to a second channel placed in a same number of partial downlink component bands as the uplink component bands, among the plurality of downlink component bands.

Advantageous Effects of Invention

According to the present invention, it is possible to improve the use efficiency of frequency in a case where communication bandwidths are asymmetric between uplink and downlink.

DETAILED DESCRIPTION

Figure 1:
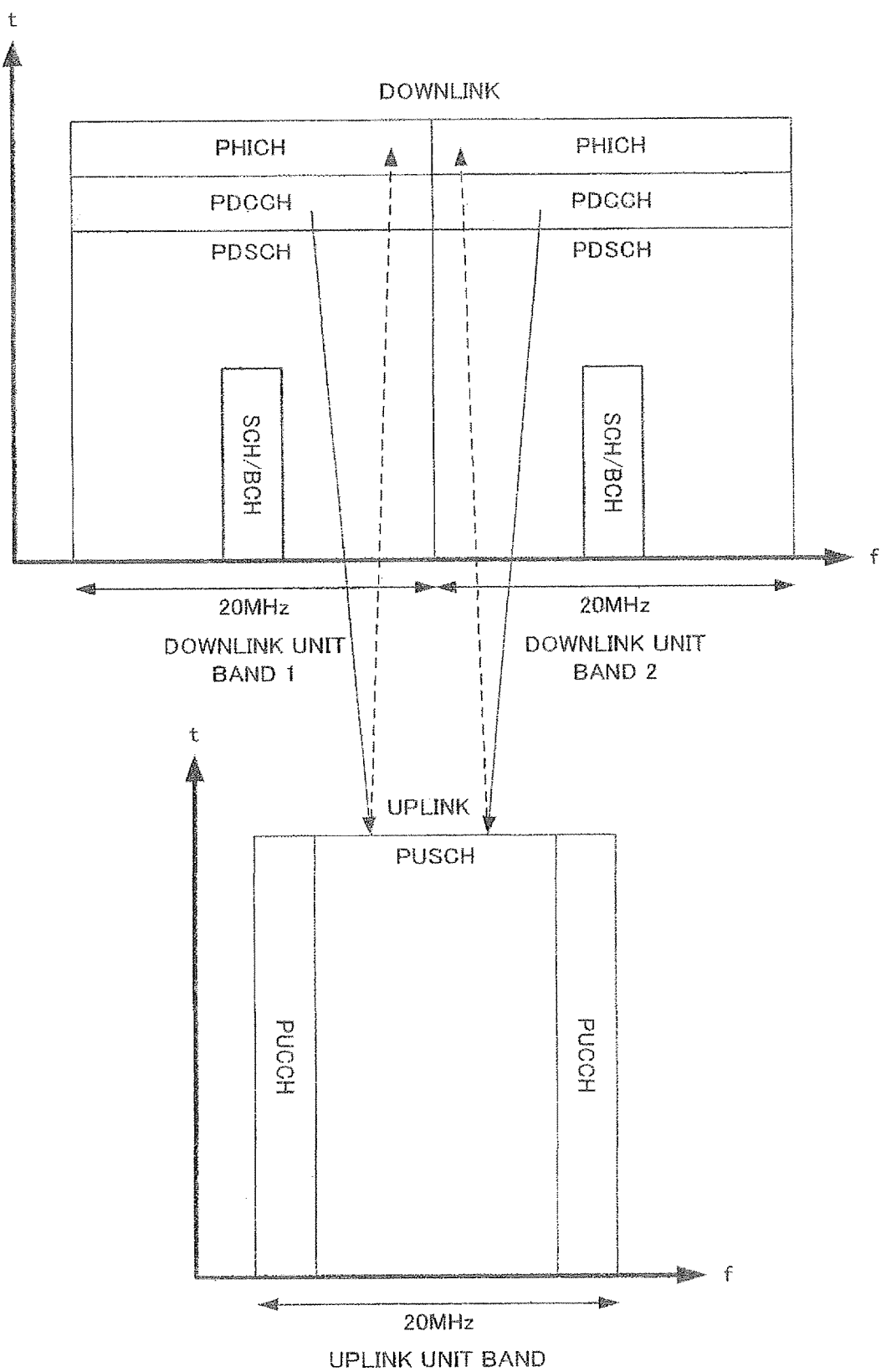
FIG. 1 shows an example of PHICH and PDCCH placement.
Figure 2:
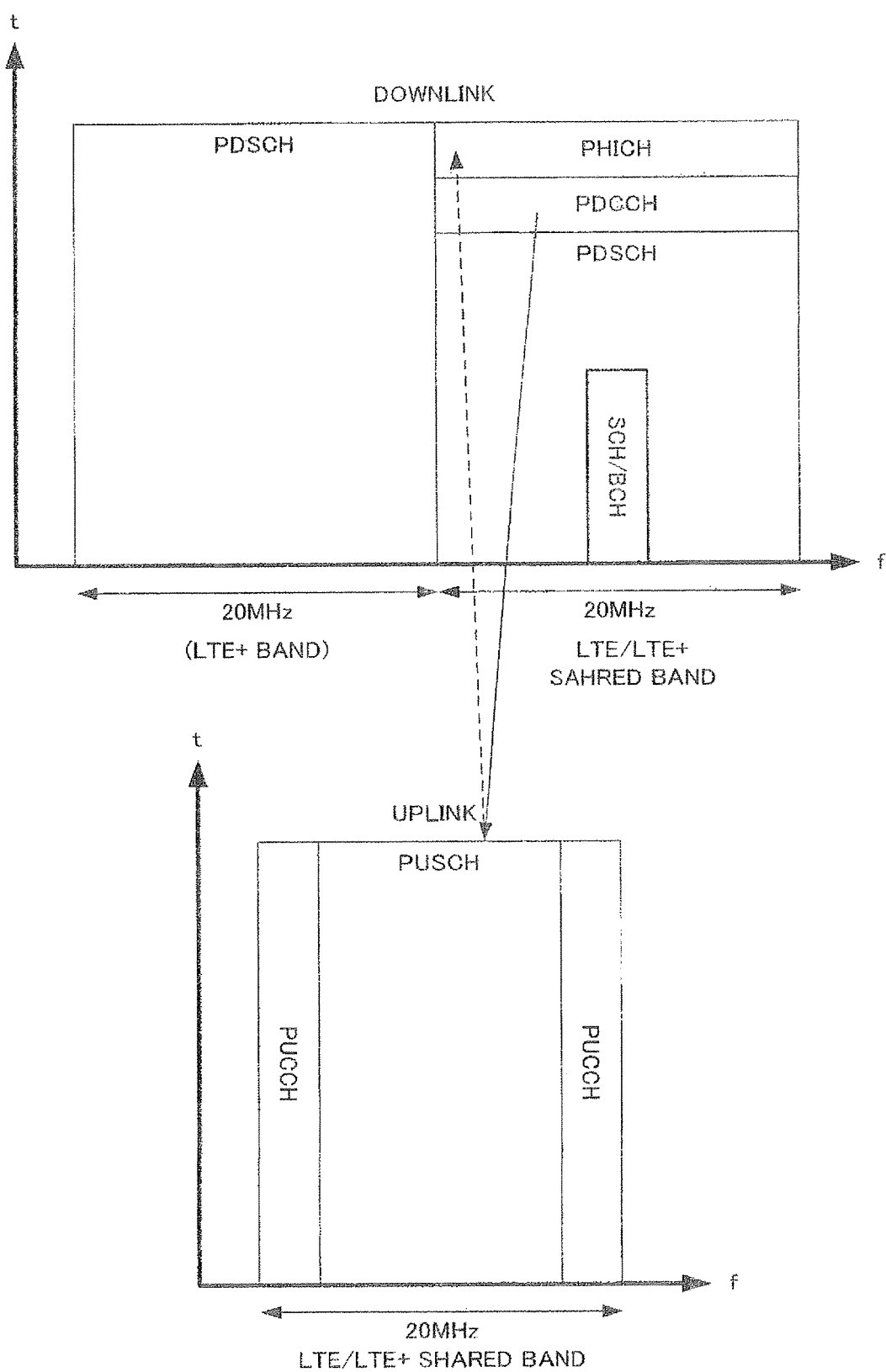
FIG. 2 shows an example of PHICH and PDCCH placement.

Taking into account the above problems, the present invention focuses on the fact that, while an LTE terminal can perform communication only in an LTE/LTE+ coexisting band in which an SCH and BCH are placed, the type-2 LTE+ terminal can perform communication using both downlink component bands of the LTE/LTE+ coexisting band and LTE+ band. That is in the LTE/LTE+ coexisting band, all terminals supported in an LTE+ system can read information.

Also, the present invention focuses on the fact that a PDCCH and PHICH are placed depending on uplink resources or downlink resources. To be more specific, uplink resource allocation information indicating uplink resources (e.g., PUSCH) to assign uplink data of terminals, and downlink resource allocation information indicating downlink resources (e.g., PDSCH) to assign downlink data for terminals, are assigned to PDCCH's and then reported to each terminal. Therefore, a PDCCH needs to be placed according to the amounts of uplink resources and downlink resources. In contrast, PHICH's (PHICH resource numbers) and PUSCH's (PUSCH RB numbers) are associated. Therefore, a PHICH needs to be placed according to the number of PUSCH RB's. That is, a PHICH needs to be placed according to only the amount of uplink resources.

Therefore, with the present invention, the LTE+ base station assigns resource allocation information of uplink data and downlink data to PDCCH's placed in respective downlink component bands, and assigns a response signal for the uplink data to PHICH's placed in a same number of partial downlink component bands (LTE/LTE+ coexisting bands) as the number of uplink component bands, among the plurality of downlink component bands. Also, the type-2 LTE+ terminal maps uplink data on uplink component bands according to resource allocation information for that terminal assigned to PDCCH's placed in respective downlink component bands, and extracts a response signal for the uplink data from PHICH's placed in a same number of partial downlink component bands (LTE/LTE+ coexisting bands) as the number of uplink bands among the plurality of downlink component bands.

Now, embodiments of the present invention will be explained in detail with reference to the accompanying drawings.

Also, in embodiments, the same components will be assigned the same reference numerals and their overlapping explanation will be omitted.

Embodiment 1

Figure 3:
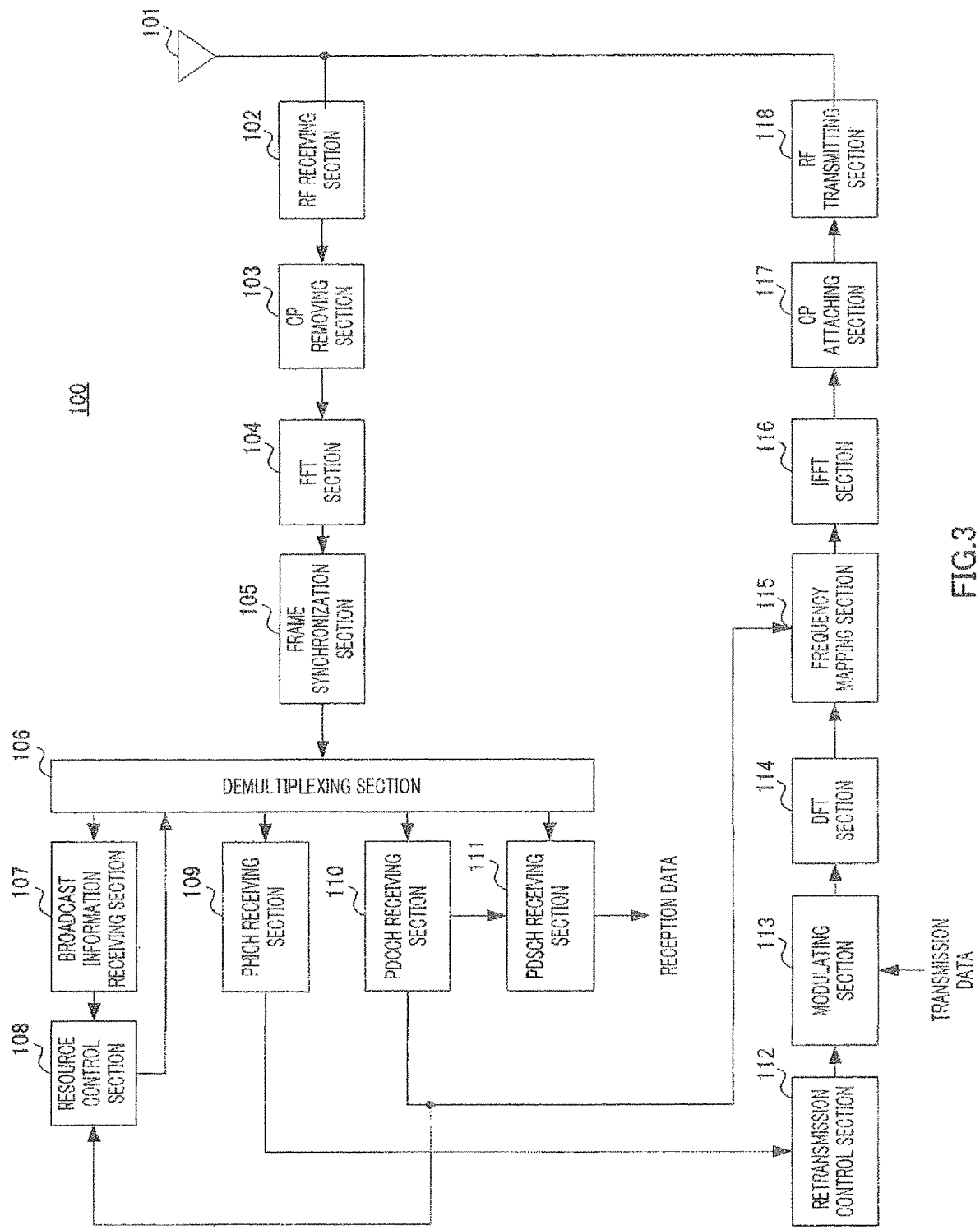
FIG. 3 is a block diagram showing a configuration of a terminal according to Embodiment 1 of the present invention.

FIG. 3 is a block diagram showing a configuration of terminal 100 according to the present embodiment. Terminal 100 is a type-2 LTE+ terminal that can perform communication using a plurality of downlink component bands at the same time.

RF receiving section 102 is designed to be able to change a reception band. RF receiving section 102 performs radio reception processing (such as down-conversion and analog-to-digital (A/D) conversion) of a radio reception signal (OFDM signal in this case) received in the reception band via antenna 101, and outputs the resulting reception signal to CP (Cyclic Prefix) removing section 103.

CP removing section 103 removes a CP from the reception signal and FFT (Fast Fourier Transform) section 104 transforms the reception signal without a CP into a frequency domain signal. This frequency domain signal is outputted to frame synchronization section 105.

Frame synchronization section 105 searches for an SCH included in the signal received as input from FFT section 104 and finds synchronization (frame synchronization) with base station 200 (described later). Also, frame synchronization section 105 finds a cell ID associated with a sequence used for the SCH (SCH sequence). That is, frame synchronization section 105 performs the same processing as in a normal cell search. Then, frame synchronization section 105 outputs frame synchronization timing information indicating the frame synchronization timing and the signal received as input from FFT section 104, to demultiplexing section 106.

Demultiplexing section 106 demultiplexes the signal received as input from frame synchronization section 105 into the BCH, response signal (i.e., PHICH signal), control signal (i.e., PDCCH signal) and data signal (i.e., PDSCH signal), based on the frame synchronization timing information received as input from frame synchronization section 105. Here, upon receiving the PHICH signal, demultiplexing section 106 extracts a response signal for uplink data of the subject terminal from the demultiplexed PHICH signal, according to a downlink component band and PHICH resource number indicated by resource control information received as input from resource control section 108. That is, demultiplexing section 106 extracts the response signal for the uplink data of the subject terminal from the PHICH placed in LTE/LTE+ coexisting bands, which are a same number of partial downlink component bands as the number of uplink component bands among a plurality of downlink component bands and in which an SCH/BCH is placed. Then, demultiplexing section 106 outputs the BCH to broadcast information receiving section 107, the PHICH signal to PHICH receiving section 109, the PDCCH signal to PDCCH receiving section 110 and the PDSCH signal to PDSCH receiving section 111.

Broadcast receiving section 107 reads the content of the BCH received as input from demultiplexing section 106, associates the RB number of the PUSCH with the PHICH resource number of the PHICH and obtains PHICH resource information indicating the number of PHICH resources. Then, broadcast information receiving section 107 outputs the PHICH resource information to resource control section 108.

Resource control section 108 specifies a PHICH to which a response signal for uplink data of the subject terminal is assigned, based on the PHICH resource information received as input from broadcast information receiving section 107 and uplink resource allocation information received as input from PDCCH receiving section 110. Here, the PHICH is placed in part of the plurality of downlink component bands. Therefore, resource control section 108 specifies a downlink component band in which the PHICH is placed, based on the PHICH resource information. Further, based on the uplink resource allocation information, resource control section 108 specifies the PHICH resource number of the PHICH associated with the RB number of a PUSCH used to transmit the uplink data of the subject terminal. Then, resource control section 108 outputs resource control information, which indicates the specified downlink component band and the PHICH resource number of the PHICH, to demultiplexing section 106.

PHICH receiving section 109 decodes the PHICH signal received as input from demultiplexing section 106 and outputs a response signal (ACK signal or NACK signal) as the decoding result to retransmission control section 112.

PDCCH receiving section 110 performs blind decoding of the PDCCH signal received as input from demultiplexing section 106. Here, a PDCCH signal is placed in each of the plurality of downlink component bands. PDCCH receiving section 110 decides a PDCCH signal of CRC=OK (no error) obtained by demasking CRC bits of the PDCCH signal received as input from demultiplexing section 106 by the terminal ID of the subject terminal, as a PDCCH signal for that terminal. Then, PDCCH receiving section 110 obtains downlink resource allocation information and uplink resource allocation information included in the PDCCH signal for the subject terminal, outputs the downlink resource allocation information to PDSCH receiving section 111 and outputs the uplink resource allocation information to frequency mapping section 115 and resource control section 108.

PDSCH receiving section 111 extracts the PDSCH signal received as input from demultiplexing section 106, based on the downlink resource allocation information received as input from PDCCH receiving section 110.

Retransmission control section 112 controls retransmission of transmission data according to a response signal (ACK signal or NACK signal) received as input from PHICH receiving section 109. To be more specific, upon receiving an ACK signal of base station 200 from PHICH receiving section 109, retransmission control section 112 commands modulating section 113 to modulate new transmission data. In contrast, upon receiving a NACK of base station 200 from PHICH receiving section 109, that is, upon retransmission, retransmission control section 109 commands modulating section 113 to modulate transmission data (retransmission data) for the NACK signal.

Modulating section 113 modulates transmission data (new transmission data or retransmission data) according to the command from retransmission control section 112, and outputs the resulting modulation signal to DFT (Discrete Fourier Transform) section 114.

DFT section 114 transforms the modulation signal received as input from modulating section 113 into the frequency domain and outputs a plurality of resulting frequency components to frequency mapping section 115.

Frequency mapping section 115 maps the plurality of frequency components received as input from DFT section 114 on a PUSCH placed on an uplink component band, according to the uplink resource allocation information received as input from PDCCH receiving section 110.

IFFT (Inverse Fast Fourier Transform) section 116 transforms the mapped frequency components into a time domain waveform and CP attaching section 117 attaches a CP to the time domain waveform.

RF transmitting section 118 performs radio transmission processing (such as up-conversion and digital-to-analog (D/A) conversion) on the signal with a CP and transmits the result via antenna 101.

Figure 4:
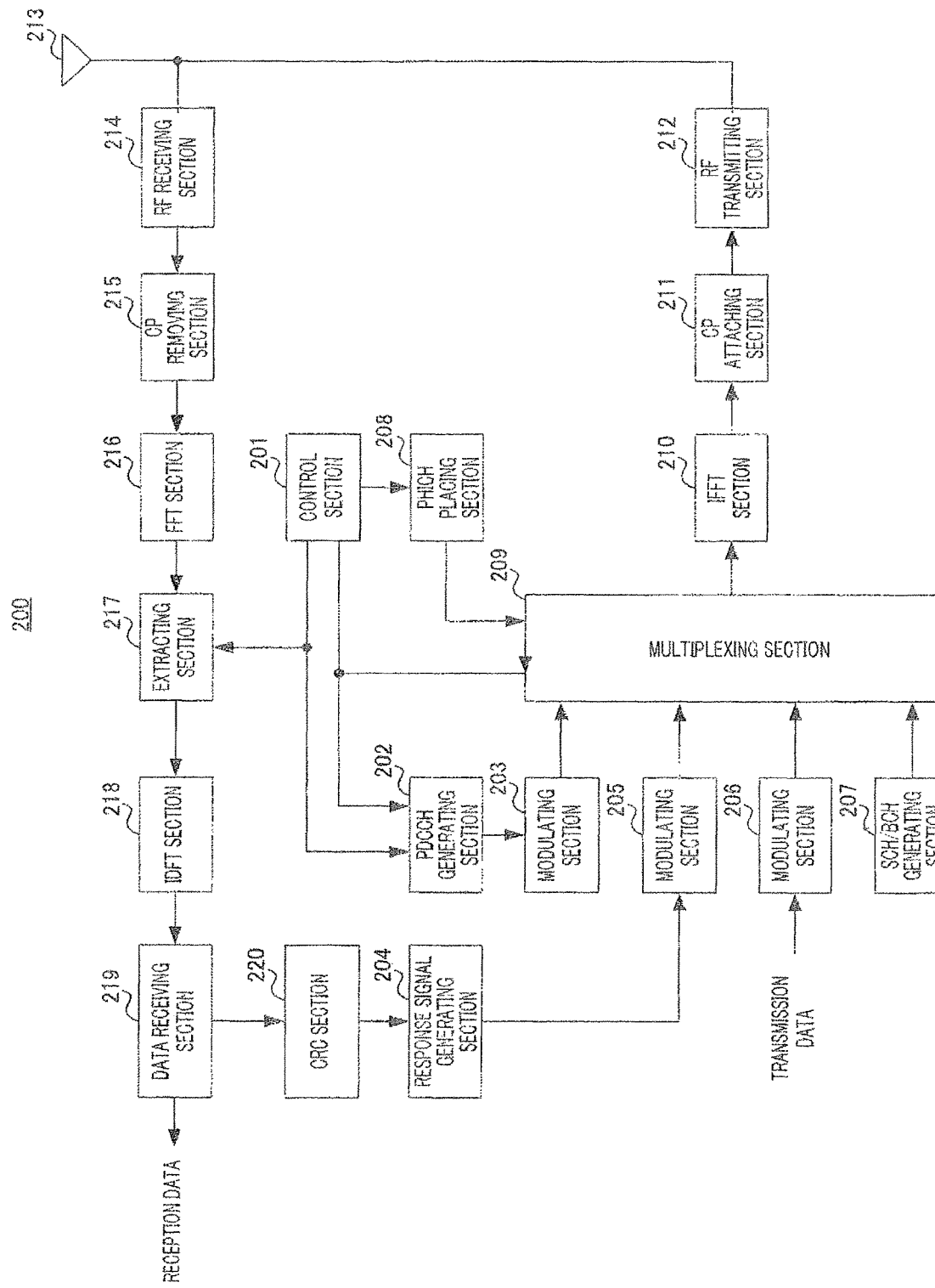
FIG. 4 is a block diagram showing a configuration of a base station according to Embodiment 1 of the present invention.

FIG. 4 is a block diagram showing a configuration of base station 200 according to the present embodiment. Base station 200 is an LTE+ base station.

Control section 201 generates uplink resource allocation information and downlink resource allocation information, outputs the uplink resource allocation information to PDCCH generating section 202 and extracting section 217, and outputs the downlink resource allocation information to PDCCH generating section 202 and multiplexing section 209. Here, control section 201 assigns the uplink resource allocation information and downlink resource allocation information to PDCCH's placed in respective downlink component bands.

Also, control section 201 assigns a response signal for uplink data to PHICH's placed in downlink bands which are a same number of partial downlink component bands as the number of uplink bands among the plurality of downlink component bands. To be more specific, control section 201 assigns a response signal for uplink data to a PHICH placed in an LTE/LTE+ coexisting band among the plurality of downlink component bands, regardless of whether the transmission source terminal of the uplink data is an LTE terminal or the transmission source terminal is an LTE+ terminal. Also, control section 201 specifies the PHICH resource number associated with the RB number of a PUSCH to which the uplink data from the terminal is assigned. Then, control section 201 generates PHICH resource information indicating the PHICH resource number and downlink component band in which a response signal for the uplink data of that terminal, and outputs this PHICH resource information to PHICH placing section 208.

PDCCH generating section 202 generates a PDCCH signal including the uplink resource allocation information and downlink resource allocation information received as input from control section 201. Also, PDCCH generating section 202 attaches CRC bits to the PDCCH signal to which the uplink resource allocation information and downlink resource allocation information are assigned, and, furthermore, masks the CRC bits by the terminal ID. Then, PDCCH generating section 202 outputs the masked PDCCH signal to modulating section 203.

Modulating section 203 modulates the PDCCH signal received as input from PDCCH generating section 202 and outputs the modulated PDCCH signal to multiplexing section 209.

Depending on an error detection result (as to whether or not there is error) received as input from CRC section 220, response signal generating section 204 generates an ACK signal when CRC=OK (no error) or a NACK signal when CRC=NG (error present). Then, response signal generating section 204 outputs the generated response signal (ACK signal or NACK signal) to modulating section 205.

Modulating section 205 modulates the response signal received as input from response signal generating section 204 and outputs the modulated response signal to multiplexing section 209.

Modulating section 206 modulates input transmission data (downlink data) and outputs the modulated transmission data to multiplexing section 209.

SCH/BCH generating section 207 generates and outputs an SCH and BCH to multiplexing section 209.

PHICH placing section 208 determines the PHICH placed in each downlink component band, based on the PHICH resource information received as input from control section 201. To be more specific, PHICH placing section 208 determines the PHICH, which is placed in the downlink component band indicated by the PHICH resource information and which is associated with the PHICH resource number indicated by the PHICH resource information, as the PHICH placed in each component band. Then, PHICH placing section 208 outputs placement information indicating the determined PHICH placement, to multiplexing section 209.

Multiplexing section 209 multiplexes the PDCCH signal received as input from modulating section 203, the response signal (i.e., PHICH signal) received as input from modulating section 205, the data signal (i.e., PDSCH signal) received as input from modulating section 206 and the SCH and BCH received as input from SCH/BCH generating section 207. Here, multiplexing section 209 maps the data signal (PDSCH signal) on downlink component bands based on the downlink resource information received as input from control section 201, and maps the response signal (PHICH signal) on the downlink component bands based on the placement information received as input from PHICH placing section 208.

IFFT section 210 transforms the multiplex signal into a time domain waveform and CP attaching section 211 obtains an OFDM signal by attaching a CP to this time domain waveform.

RF transmitting section 212 performs radio transmission processing (such as up-conversion and digital-to-analog (D/A) conversion) on the OFDM signal received as input from CP attaching section 211 and transmits the result via antenna 213. By this means, an OFDM signal including resource allocation information or response signal is transmitted.

In contrast, RF receiving section 214 performs radio reception processing (such as down conversion and analog-to-digital (A/D) conversion) on a radio reception signal received in a reception band via antenna 213, and outputs the resulting reception signal to CP removing section 215.

CP removing section 215 removes a CP from the reception signal and FFT section 26 transforms the reception signal without a CP into a frequency domain signal.

Extracting section 217 extracts uplink data from the frequency domain signal received as input from FFT section 216, based on the uplink resource allocation information received as input from control section 201, and IDFT (Inverse Discrete Fourier Transform) section 218 transforms the extracted signal into a time domain signal and outputs this time domain signal to data receiving section 219.

Data receiving section 219 decodes the time domain signal received as input from IDFT section 218. Then, data receiving section 219 outputs the decoded uplink data as reception data and also outputs this data to CRC section 220.

CRC section 220 performs error detection of the decoded uplink data using CRC and outputs the error detection result (CRC=OK (no error) or CRC=NG (error present)) to response signal generating section 204.

Next, operations of terminal 100 and base station 200 will be explained in detail.

Figure 5:
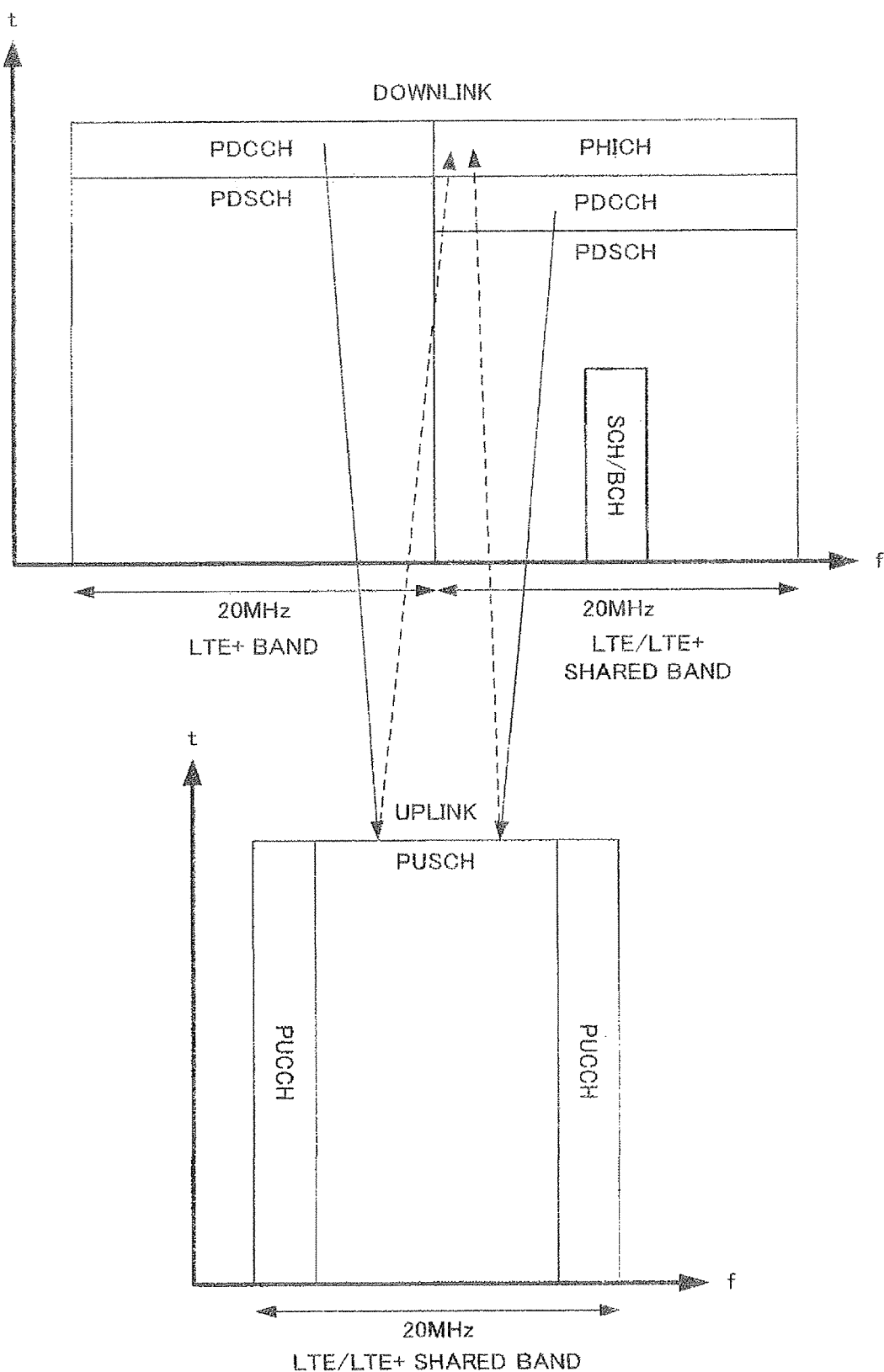
FIG. 5 shows an example of PHICH and PDCCH placement according to Embodiment 1 of the present invention.

Base station 200 transmits a PHICH and PDCCH in the frequency positions as shown in the upper part of FIG. 5. As shown in FIG. 5, base station 200 can perform communication using two downlink component bands (LTE/LTE+ coexisting band and LTE+ band) and one uplink component band (LTE/LTE+ coexisting band). Here, as shown in the upper part of FIG. 5, PDCCH's are placed in two downlink component bands, respectively. In contrast, a PHICH is placed only in a same number of partial downlink component bands as the number of uplink component bands (i.e., one) among the two downlink component bands. To be more specific, as shown in the upper part of FIG. 5, a PHICH is placed in the LTE/LTE+ coexisting band in which both the LTE terminal and LTE+ terminal can perform communication. That is, the PHICH is placed in the LTE/LTE+ coexisting band in which an SCH and BCH are placed.

Also, the BCH includes information related to the number of OFDM symbols in which the PHICH is placed and information related to the number of resources for the PHICH. Here, assume that the number of OFDM symbols in which the PHICH is placed has two patterns (i.e., one symbol and three symbols). Therefore, the number of OFDM symbols placed in the PHICH is included in the BCH as one-bit information. Also, for convenience, the number of PHICH resources is reported in association with the number of RB's included in the downlink component band. To be more specific, the number of PHICH resources is twice, one time, half or quarter of the number of RB's included in the downlink component band. Also, if a plurality of RB's are used to transmit uplink data, terminal 100 and base station 200 decide that a response signal is assigned to the PHICH associated with the RB of the minimum RB number among the plurality of RB's used to transmit the uplink data.

First, a case will be explained where base station 200 (LTE+ base station) and terminal 100 (type-2 LTE+ terminal) perform communication.

First, control section 201 of base station 200 assigns uplink resource allocation information and downlink resource allocation information to be reported to terminal 100, to one of PDCCH's placed in the LTE/LTE+ coexisting band and LTE+ band shown in the upper part of FIG. 5.

Demultiplexing section 106 of terminal 100 demultiplexes the PDCCH signals placed in the LTE/LTE+ coexisting band and LTE+ band shown in the upper part of FIG. 5, from reception signals, and PDCCH receiving section 110 obtains resource allocation information (uplink resource allocation information and downlink resource allocation information) for the subject terminal from the demultiplexed PDCCH signals. Then, according to the obtained uplink resource allocation information, frequency mapping section 115 of terminal 100 maps transmission data on the PUSCH placed in the uplink component band (LTE/LTE+ coexisting band) shown in the lower part of FIG. 5.

Next, response signal generating section 204 of base station 200 generates a response signal (ACK signal or NACK signal) for uplink data from terminal 100. Also, control section 201 of base station 200 assigns a response signal for the uplink data of terminal 100 to the PHICH placed in the LTE/LTE+ coexisting band shown in the upper part of FIG. 5. Here, control section 201 specifies the PHICH resource number of the PHICH resource number associated with the RR number of the PUSCH assigned to the uplink data, from the PHICH placed in the LTE/LTE+ coexisting band shown in the upper part of FIG. 5.

That is, as shown in FIG. 5, regardless of whether the PDCCH to which uplink resource allocation information for terminal 100 is assigned is the PDCCH placed in the LTE/LTE+ coexisting band or the PDCCH placed in the LTE+ band, control section 201 of base station 200 assigns a response signal to the PHICH placed in the LTE/LTE+ coexisting band. For example, as shown in FIG. 5, even in a case where base station 200 transmits resource allocation information using the PDCCH placed in the LTE+ band, control section 201 assigns a response signal for uplink data transmitted according to the resource allocation information, to the PHICH placed in the LTE/LTE+ coexisting band.

Also, control section 108 of terminal 100 selects the LTE/LTE+ coexisting band from the two downlink component bands, as a downlink component band to which the response signal for the uplink data is assigned. That is, as shown in FIG. 5, regardless of whether the PDCCH to which uplink resource allocation information for the subject terminal is assigned is the PDCCH placed in the LTE/LTE+ coexisting band or the PDCCH placed in the LTE+ band, similar to control section 201 of base station 200, resource control section 108 performs control so as to extract the response signal for the uplink data from the PHICH placed in the LTE/LTE+ coexisting band. Further, resource control section 108 calculates the PHICH resource number of the PHICH associated with the RB number of the PUSCH on which the uplink data is mapped. Further, demultiplexing section 106 extracts the response signal for the uplink data from the PHICH which is placed in the downlink component band (LTE/LTE+ coexisting band) selected in resource control section 108 and which has the PHICH resource number calculated in resource control section 108.

In contrast, upon communicating with a terminal that can perform communication using only one component band (i.e., LTE terminal or type-1 LTE+ terminal), base station 200 (LTE+ base station) includes the LTE terminal and type-1 LTE+ terminal in the LTE/LTE+ coexisting band. Therefore, the LTE terminal or the type-1 LTE+ terminal receives resource allocation information assigned to the PDCCH placed in the LTE/LTE+ coexisting band and transmits uplink data (PUSCH signal) to base station 200 according to the resource allocation information. Then, the LTE terminal or the type-1 LTE+ terminal extracts a response signal for the uplink data from the PHICH placed in the LTE/LTE+ coexisting band. That is, the LTE terminal or the type-1 LTE+ terminal communicates with base station 200 always using the LTE/LTE+ coexisting band.

Thus, among a plurality of downlink component bands, a downlink component band in which an SCH and BCH are placed, that is, a downlink component band in which both an LTE terminal and LTE+ terminal can perform communication, is used as a partial downlink component band in which a PHICH is placed. By this means, all terminals (LTE terminal, type-1 LTE+ terminal and type-2 LTE+ terminal (terminal 100)) supported by an LTE+ terminal (base station 200) receive a response signal assigned to the PHICH placed in the LTE/LTE+ coexisting band. That is, all terminals supported by the LTE+ system can receive the same PHICH. Therefore, a PHICH needs not be placed in the LTE+ band, so that it is possible to reduce the PHICH overhead. Further, since a PHICH needs not be placed in the LTE+ band, it is possible to place more PDSCH's and improve the use efficiency of frequency.

Also, PDCCH's are placed in both the LTE/LTE+ coexisting band and
LTE+ band. Consequently, by using PDCCH's placed in respective downlink component bands, base station 200 can efficiently assign PDSCH's placed in two respective component bands and a PUSCH placed in one uplink component band to each terminal.

As described above, according to the present embodiment, an LTE+ base station assigns uplink resource allocation information and downlink resource allocation information to PDCCH's placed in respective downlink component bands, and assigns a response signal for uplink data to a PHICH placed in downlink component bands which are a same number of partial downlink component bands as the number of uplink component bands among the plurality of downlink component bands. By this means, the LTE+ base station can transmit PHICH's and PDCCH's required for the LTE terminal and LTE+terminal, with placement of high use efficiency of frequency. Therefore, according to the present embodiment, it is possible to improve the use efficiency of frequency in a case where communication bandwidths are asymmetric between uplink and downlink.

Embodiment 2

A case will be explained with the present embodiment where a type-1 LTE+ terminal performs communication in an LTE+ band. Also, the basic configurations of a terminal and base station according to the present embodiment are the same as the configuration of the terminal and base station explained in Embodiment 1. Therefore, the terminal according to the present embodiment will be explained using FIG. 3 and also FIG. 4.

Figure 6:
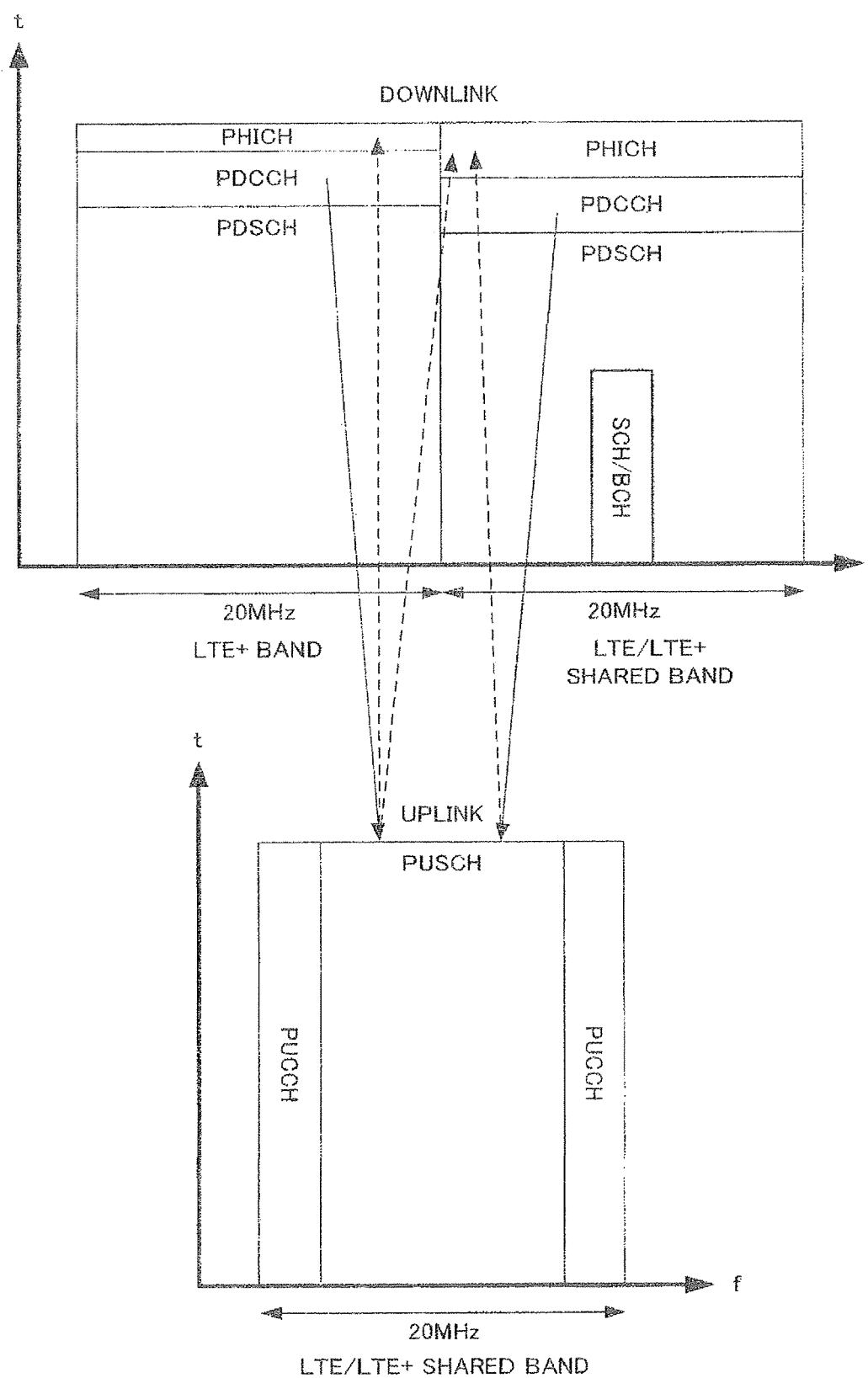
FIG. 6 shows an example of PHICH and PDCCH placement according to Embodiment 2 of the present invention.

Base station 200 according to the present embodiment transmits PHICH's and PDCCH's in frequency placement as shown in the upper part of FIG. 6. As shown in FIG. 6, similar to FIG. 5 of Embodiment 1, base station 200 can perform communication using two downlink component bands (LTE/LTE+ coexisting band and LTE+ band) and one uplink component band (LTE/LTE+ coexisting band). Here, as shown in the upper part of FIG. 6, PHICH's are placed in the downlink component bands of the LTE/LTE+ coexisting band and LTE+ band. Here, as shown in the upper part of FIG. 6, the amount of resources for the PHICH placed in the LTE/LTE+ coexisting band is larger than the amount of resources for the PHICH placed in the LTE+ band. To be more specific, while the amount of resources for the PHICH placed in the LTE/LTE+ coexisting band is the same as in Embodiment 1 (upper part of FIG. 5), the amount of resources for the PHICH placed in the LTE+ band is smaller than the amount of resources for the PHICH placed in the LTE/LTE+ coexisting band.

Also, the amount of resources for the PHICH placed in the LTE+ band is associated in advance with the amount of resources for the PHICH placed in the LTE/LTE+ coexisting band. For example, the amount of resources for the PHICH placed in the LTE+ band is half the amount of resources for the PHICH placed in the LTE/LTE+ coexisting band.

Also, as shown in the upper part of FIG. 6, similar to Embodiment 1, PDCCH's are placed in two downlink component bands, respectively, and an SCH/BCH is placed only in the LTE/LTE+ coexisting band.

Also, operations of the LTE terminal and the type-1 LTE+ terminal and type-2 LTE+ terminal (terminal 100) included in the LTE/LTE+ coexisting band shown in the upper part of FIG. 6, are the same as in Embodiment 1. That is, these terminals each receive a response signal placed in the PHICH placed in the LTE/LTE+ coexisting band shown in the upper part of FIG. 6.

Therefore, a case will be explained below where base station 200 (LTE+ base station) and the type-1 LTE+ terminal included in the LTE+ band shown in the upper part of FIG. 6 perform communication.

First, the type-1 LTE+ terminal (i.e., a terminal that can perform communication using only one component band) is included in the LTE/LTE+ coexisting band, receives an SCH/BCH placed in the LTE/LTE+ coexisting band and access base station 200. Next, base station 200 commands the type-1 LTE+ terminal to move from the LTE/LTE+ coexisting band to the LTE+ band, and the type-1 LTE+ terminal moves to the LTE+ band according to the command from base station 200. By this means, the type-1 LTE+ terminal is included in the LTE+ band.

Here, the type-1 LTE+ terminal obtains PHICH resource information (e.g., an OFDM symbol in which a PHICH is placed or the number of PHICH resources) in the LTE/LTE+ coexisting band, indicated by the BCH placed in the LTE/LTE+ coexisting band. Then, the type-1 LTE+ terminal calculates resource information for the PHICH, placed in the LTE+ band, based on the association between the PHICH placed in the LTE/LTE+ coexisting band and the PHICH placed in the LTE+ band. For example, the type-1 LTE+ terminal calculates a half of the number of resources for the PHICH placed in the LTE/LTE+ coexisting band, as the number of resources for the PHICH placed in the LTE+ band.

Then, the type-1 LTE+ terminal receives resource allocation information assigned to the PDCCH placed in the LTE+ band shown in the upper part of FIG. 6, and transmits uplink data (PUSCH signal) to base station 200 according to the resource allocation information.

Control section 201 of base station 200 performs perform control to assign a response signal for uplink data of the type-1 LTE+ terminal to the PHICH placed in the LTE+ band among two downlink component bands shown in the upper part of FIG. 6. That is, as shown in FIG. 6, base station 200 assigns a response signal for uplink data of the type-1 LTE+ terminal included in the LTE+ band, to the PHICH placed in the LTE+ band. Also, similar to base station 200, the type-1 LTE+ terminal extracts the response signal for the uplink data from the PHICH placed in the LTE+ band.

Thus, a PHICH is placed in the LTE+ band shown in FIG. 6, so that it is possible to include the type-1 LTE+ terminal in the LTE+ band. Therefore, when included in the LTE+ band, the type-1 LTE+ terminal receives the response signal assigned to the PHICH placed in the LTE+ band. In contrast, similar to Embodiment 1, the LTE terminal and type-2 LTE+ terminal (terminal 100) receive the PHICH placed in the LTE/LTE+ coexisting band. That is, the PHICH placed in the LTE+ band is used only in the type-1 LTE+ terminal included in the LTE+ band.

Here, the PHICH placed in the LTE+ band is associated with the same PUSCH as the PUSCH associated with the PHICH placed in the LTE/LTE+ coexisting band. However, as described above, the amount of resources for the PHICH placed in the LTE+ band is smaller than the amount of resources for the PHICH placed in the LTE/LTE+ coexisting band, so that it is possible to reduce the PHICH overhead in the LTE+ band. Also, in the LTE+ band, by making the amount of PHICH resources smaller than the amount of resources for the PHICH placed in the LTE/LTE+ coexisting band, it is possible to place more PDSCH's.

As described above, according to the present embodiment, even in a case where the type-1 LTE+ terminal is included in the LTE+ band, similar to Embodiment 1, it is possible to improve the use efficiency of frequency. Further, according to the present embodiment, when included in the LTE+ band, the type-1 LTE+ terminal calculates PHICH resource information in the LTE+ band based on PHICH resource information in the LTE/LTE+ coexisting band. By this means, the base station does not require signaling of PHICH resource information in the LTE+ band, so that it is possible to further improve the use efficiency of frequency.

Also, a case has been described above with the present embodiment where resource information of a PHICH placed in an LTE+ band is associated with resource information of a PHICH placed in an LTE/LTE+ coexisting band. However, with the present invention, resource information of the PHICH placed in the LTE+ band may be reported using a BCH in the LTE/LTE+ coexisting band, or may be reported separately to the type-1 LTE+ terminal included in the LTE+ band.

Also, a case has been described above with the present embodiment where, in the same way as in Embodiment 1, a type-2 LTE+ terminal selects a PHICH placed in a downlink component band (LTE/LTE+ coexisting band) in which an SCH/BCH is placed, from a plurality of downlink component bands. However, with the present invention, an LTE+ base station may command the type-2 LTE+ terminal separately as to whether to select the PHICH placed in the LTE/LTE+ coexisting band or a PHICH placed in the LTE+ band. By this means, even in a case where an SCH/BCH is placed in all downlink component bands, the type-2 LTE+ terminal can specify a downlink component band in which a PHICH assigned a response signal is placed, so that it is possible to provide the same effect as in the present invention.

Embodiment 3

Similar to Embodiment 1, when communication bandwidths (the number of component bands) are asymmetric between uplink and downlink, a case will be explained with the present embodiment where PHICH resources are placed only in one component band and uplink resource allocation information of uplink data is transmitted to terminals by a PDCCH only in a partial downlink component band in which PHICH resources are placed.

Also, downlink resource allocation information and uplink resource allocation information of the downlink component band in which PHICH resources are placed, have the same information size (i.e., the number of bits required for transmission). Also, a PDCCH signal includes type information of resource allocation information (e.g., one-hit flag). Therefore, even if a PDCCH signal including downlink resource allocation information and a PDCCH signal including uplink resource allocation information are the same size, by identifying type information of resource allocation information, it is possible to distinguish between downlink resource allocation information and uplink resource allocation information. Also, the PDCCH format upon transmitting uplink resource allocation information is PDCCH format 0, and the PDCCH format upon transmitting downlink resource allocation information is PDCCH format 1A.

In contrast, if the uplink bandwidth and the downlink bandwidth are different, the information size is different between downlink resource allocation information and uplink resource allocation information. With the present embodiment, if the information size of downlink resource allocation information and the information size of uplink resource allocation information are different due to such a bandwidth difference, by attaching zero information (zero padding) to resource allocation information assigned to a PDCCH in a partial downlink component band, the information size of downlink resource allocation information and the information size of uplink resource allocation information are made equal. By this means, regardless of downlink resource allocation information and uplink resource allocation information, the PDCCH signal size is maintained the same.

The components of terminal 800 according to Embodiment 3 of the present invention will be explained using FIG. 7.

Figure 7:
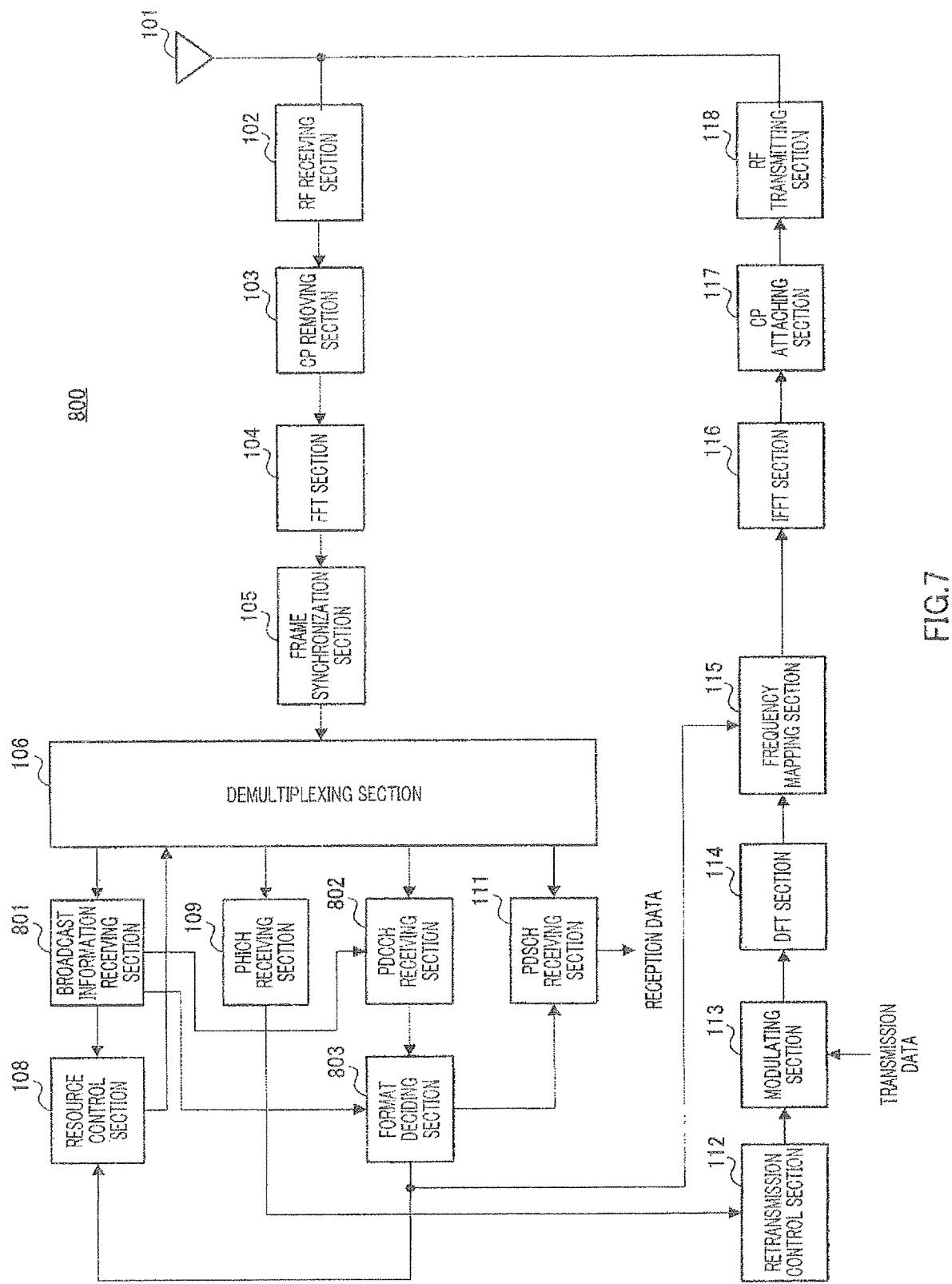
FIG. 7 is a block diagram showing a configuration of a terminal according to Embodiment 3 of the present invention.

FIG. 7 is a block diagram showing a configuration of terminal 800 according to Embodiment 3 of the present invention. Terminal 800 shown in FIG. 7 employs a configuration adding format deciding section 803 and replacing PDCCH receiving section 110 with PDCCH receiving section 802 and broadcast information receiving section 107 with broadcast information receiving section 801 in terminal 100 according to Embodiment 1 shown in FIG. 3. Also, in FIG. 7, the same components as in FIG. 3 will be assigned the same reference numerals and their explanation will be omitted.

Based on frame synchronization timing information received as input from frame synchronization section 105, demultiplexing section 106 demultiplexes a signal received as input from frame synchronization section 105 into the BCH, response signal (i.e., PHICH signal), control signal (i.e., PDCCH signal) and data signal (i.e., PDSCH signal). Here, upon receiving the PHICH signal, demultiplexing section 106 extracts a response signal for uplink data of the subject terminal from the demultiplexed PHICH signal, according to a downlink component band and PHICH resource number indicated by resource control information received as input from resource control section 108. That is, demultiplexing section 106 extracts a response signal for uplink data of the subject terminal from a PHICH placed in LTE/LTE coexisting bands which are a same number of partial downlink component bands as the number of uplink component bands among a plurality of downlink component bands and in which an SCH/BCH is placed. Then, demultiplexing section 106 outputs the BCH to broadcast information receiving section 801, the PHICH signal to PHICH receiving section 109, the PDCCH signal to PDCCH receiving section 802 and the PDSCH signal to PDSCH receiving section 111.

Broadcast information receiving section 801 reads the content of the BCH received as input from demultiplexing section 106, associates the RB number of the PUSCH and the PHICH resource number of the PHICH, and obtains PHICH resource information indicating the number of PHICH resources. Then, broadcast information receiving section 801 outputs the PHICH resource information to resource control section 108. Also, broadcast information receiving section 801 reads the content of the BCH received as input from demultiplexing section 106 and obtains BCH information related to formats of downlink component bands and uplink component band of base station 900 (described later). Broadcast information receiving section 801 obtains, for example, the number of uplink component bands, the number of downlink bands, the identification number and bandwidth of each component band, information associating the uplink bands and downlink bands, and reference component band information. Also, although the reference component band can be found from the bandwidth of an uplink component band and the bandwidth of a downlink component band, base station 900 includes identification information of the reference component band in a BCH in this case. Then, broadcast information receiving section 801 outputs the obtained BCH information to format deciding section 803 and PDCCH receiving section 802.

PDCCH receiving section 802 performs blind decoding of the PDCCH signal in each downlink component band, received as input from demultiplexing section 106, using the information size of resource allocation information supporting the bandwidth of each downlink component band, the information size of resource allocation information supporting the bandwidth of the uplink component band and the terminal ID of the subject terminal. Here, PDCCH signals are placed in the plurality of downlink component bands, respectively.

That is, first, PDCCH receiving section 802 specifies the CRC bit corresponding part, included in each PDCCH signal. At this time, a case is possible where base station 900 adjusts the information size by zero padding. Therefore, PDCCH receiving section 802 specifies the CRC bit corresponding part in the PDCCH signal of the reference component band, using the information size (payload size) found from the wider bandwidth between the bandwidth of the reference component band and the bandwidth of the uplink component band associated with that reference component band. In contrast, only downlink resource allocation information is included in downlink component bands other than the reference component band. Therefore, PDCCH receiving section 802 specifies the CRC bit corresponding part in downlink component bands other than the reference component band, using the information size based on the bandwidths of the downlink component bands. Also, PDCCH receiving section 802 decides a PDCCH signal of CRC=OK (no error) obtained by demasking CRC bits of the PDCCH signal received as input from demultiplexing section 106 by the terminal ID of the subject terminal, as a PDCCH signal for that terminal. Thus, the PDCCH signal decided for the subject terminal is outputted to format deciding section 803. Also, the reference component band will be described later.

Based on type information of resource allocation information included in the PDCCH signal received as input from PDCCH receiving section 802, format deciding section 803 decides whether the format of the PDCCH signal is "format 0" or "format 1A." Upon deciding format 0, format deciding section 803 outputs uplink resource allocation information included in the PDCCH signal to frequency mapping section 115 and resource control section 108. Also, upon deciding format 1A, format deciding section 803 outputs downlink resource allocation information included in the PDCCH signal to PDSCH receiving section 111. At this time, uplink resource allocation information is not assigned to a PDCCH of a component band in which PHICH resources are not placed, and, consequently, format deciding section 803 decides format 0 in the component band in which the PHICH resources are not placed.

Resource control section 108 specifies a PHICH to which a response signal for uplink data of the subject terminal is assigned, based on the PHICH resource information received as input from broadcast information receiving section 801 and the uplink resource information received as input from format deciding section 803. Here, a PHICH is placed in a partial component band among a plurality of downlink component bands. Therefore, resource control section 108 specifies the downlink component band in which the PHICH is placed, based on the PHICH resource information. Further, resource control section 108 specifies the PHICH resource number of the PHICH associated with the RB number of a PUSCH used to transmit uplink data of the subject terminal, based on the uplink resource allocation information. Then, resource control section 108 outputs resource control information indicating the specified downlink component band and PHICH resource number of the PHICH, to demultiplexing section 106.

PDSCH receiving section 111 extracts reception data from the PDSCH signal received as input from demultiplexing section 106, based on the downlink resource allocation information received as input from format deciding section 803.

Frequency mapping section 115 maps the plurality of frequency components received as input from DFT section 114 on the PUSCH placed in the uplink component band, according to the uplink resource allocation information received as input from format deciding section 803.

Figure 8:
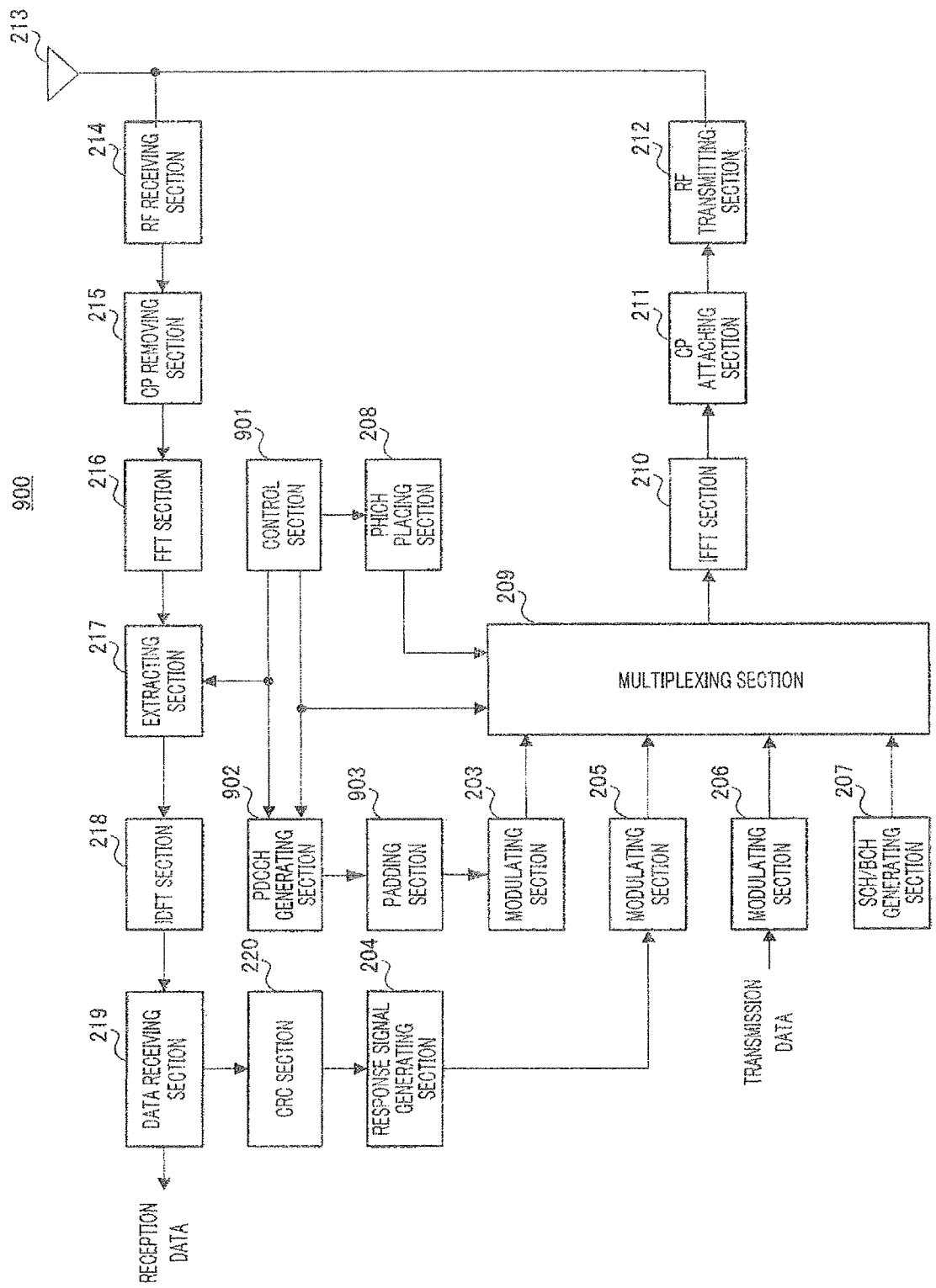
FIG. 8 is a block diagram showing a configuration of a base station according to Embodiment 3 of the present invention.

Next, a configuration of base station 900 according to Embodiment 3 of the present invention will be explained using FIG. 8. FIG. 8 is a block diagram showing a configuration of base station 900 according to Embodiment 3 of the present invention.

Base station 900 shown in FIG. 8 employs a configuration adding padding section 903 and replacing control section 201 with control section 901 and PDCCH generating section 202 with PDCCH generating section 902 in base station 200 according to Embodiment 1 shown in FIG. 4. Also, in FIG. 8, the same components as in FIG. 4 will be assigned the same reference numerals and their explanation will be omitted.

Control section 901 generates uplink resource allocation information and downlink resource allocation information, outputs the uplink resource allocation information to PDCCH generating section 902 and extracting section 217, and outputs the downlink allocation information to PDCCH generating section 902 and multiplexing section 209. Control section 901 assigns the downlink resource allocation information to all of a plurality of downlink component bands, while assigning the uplink resource allocation information only to part of the plurality of downlink component bands. Here, especially, among the plurality of downlink component bands associated with one uplink component band, the uplink resource allocation information is assigned to the downlink component band having the closest bandwidth to the bandwidth of the uplink component band. Here, an assignment target downlink component band to which uplink resource allocation information is assigned, may be called "reference component band."

Control section 901 outputs the uplink resource allocation information and downlink resource allocation information to PDCCH generating section 902 and outputs information related to the reference component band (which may be referred to as "reference component band information") to PDCCH generating section 902. Here, this reference component band information may be included in a BCH in SCH/BCH generating section 207.

Also, control section 901 outputs bandwidth comparison information indicating which of the bandwidths of the reference component band and uplink component band is larger, to padding section 903 via PDCCH generating section 902.

Also, control section 901 assigns a response signal for uplink data to a PHICH placed in a same number of partial component bands as the number of uplink component bands, among the plurality of downlink component bands. To be more specific, control section 901 assigns a response signal for uplink data to a PHICH placed in the LTE/LTE+ coexisting band among the plurality of downlink component bands, regardless of whether or not the transmission source terminal of the uplink data is an LTE terminal or LTE+ terminal. Also, control section 901 specifies the PHICH resource number associated with the RB number of a PUSCH to which the uplink data from the terminal is assigned. Then, control section 901 generates PHICH resource information indicating the PHICH resource number and the downlink component band in which the response signal for the uplink data of the terminal is placed, and outputs this PHICH resource information to PHICH placing section 208.

PDCCH generating section 902 generates a PDCCH signal including the uplink resource allocation information and downlink resource allocation information from control section 901. At this time, PDCCH generating section 902 includes the uplink resource allocation information and downlink resource allocation information in the PDCCH signal placed in the downlink component band indicated by the reference component band information, and includes only the downlink resource allocation information in PDCCH signals placed in other downlink component bands. Then, PDCCH generating section 902 outputs these PDCCH signals to padding section 903.

Padding section 903 attaches zero information (zero padding) to one of the downlink resource allocation information and uplink resource allocation information with the smaller information size until the information sizes are equal, in the PDCCH signal received as input from PDCCH generating section 902. At this time, padding section 903 does not attach zero information to downlink resource allocation information for a PDCCH placed in a downlink component band in which PHICH resources are not placed, and attaches zero information only to downlink resource allocation information or uplink resource allocation information for a PDCCH placed in a downlink component band in which PHICH resources are placed. Also, padding section 903 decides to which of downlink resource allocation information and uplink resource allocation information zero information is attached, based on the bandwidth comparison INFORMATION. Also, padding section 903 attaches CRC bits to the PDCCH signal to which the uplink resource allocation information and downlink resource allocation information are assigned, and masks the CRC bits by the terminal ID. Then, padding section 903 outputs the PDCCH signal with CRC bits to modulating section 203.

Modulating section 203 modulates the PDCCH signal received as input from padding section 903 and outputs the modulated PDCCH signal to multiplexing section 209.

Figure 9:
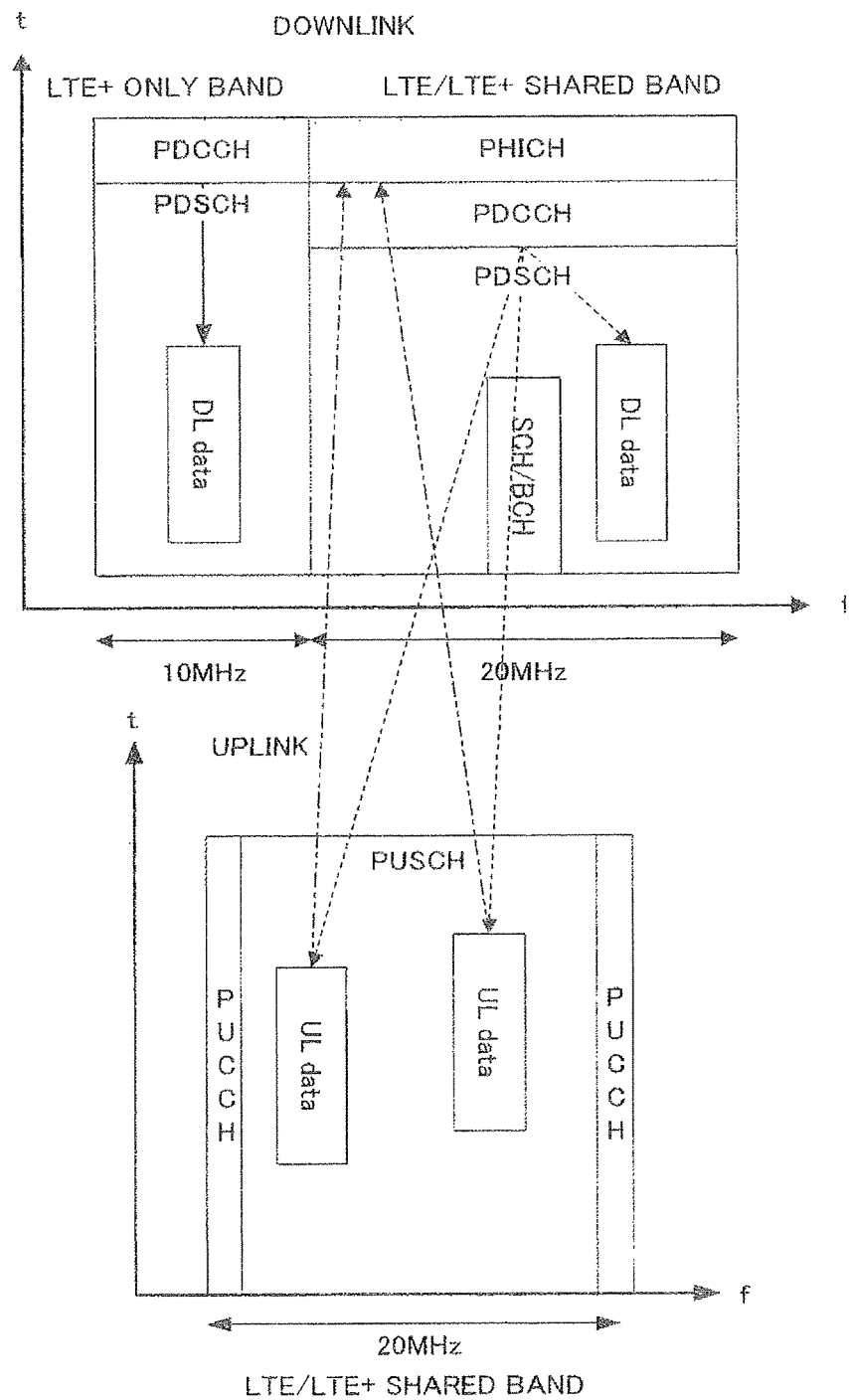
FIG. 9 shows an example of PHICH and PDCCH placement according to Embodiment 3 of the present invention.

Next, operations of terminal 800 and base station 900 will be explained using FIG. 9. FIG. 9 shows an example of placing a PHICH and PDCCH.

Base station 900 places PHICH resources only in a partial component band of a plurality of downlink component bands, and transmits uplink resource allocation information of uplink data using a PDCCH only from the partial component band in which PHICH resources are placed. That is, base station 900 does not use PDCCH resources for transmitting uplink resource allocation information of uplink data in a component band in which PHICH resources are not placed.

Also, similar to above Embodiment 1, PDCCH receiving section 802 of terminal 800 performs blind decoding of a PDCCH signal received as input from demultiplexing section 106. The size of PDCCH information bits required for blind decoding is determined by a decision result as to whether or not PHICH resources are placed in a component band in which the PDCCH is transmitted, and by the bandwidth of the uplink component band associated with the downlink component band in which PDCCH resources are transmitted.

That is, in a downlink component band in which PHICH resources are not placed, the information size used for blind decoding of PDCCH is determined only by the bandwidth of the downlink component band.

By contrast with this, in a downlink component band in which PHICH resources are placed, the information size used for blind decoding of PDCCH is determined with reference to the wider bandwidth between the bandwidth of the downlink component band and the bandwidth of the uplink component band. To be more specific, when component band frequency is smaller, the number of bits required to indicate the frequency position of assigned link resources is small. Consequently, for example, when the uplink component band is larger than the downlink component band, it is decided that "0" is inserted (zero padding) in downlink resource allocation information of downlink data. By this means, it is possible to assume that uplink resource allocation information of uplink data and downlink resource allocation information have the same information size. By this zero padding, the information size of uplink resource allocation information of uplink data and the information size of downlink resource allocation information are the same, so that it is possible to try blind decoding for these items of data at the same time and reduce the circuit scale of the terminal. Also, based on one-bit "uplink/downlink allocation information decision flag" included in the information bits, it is possible to decide whether information with successful blind decoding is uplink resource allocation information of uplink data or downlink resource allocation information of downlink data.

Also, in zero padding, when the bandwidth is different between the downlink component band on the higher-frequency side and the uplink component band, regarding this pair, zero information is attached to downlink resource allocation information with the smaller size until the information size of the downlink resource allocation information and the information size of uplink resource allocation information are the same. However, zero padding is performed for size adjustment, and, consequently, zero information contains no particular meaning. That is, a signal that is not essentially necessary is included in downlink control information, and, consequently, if the entire power is fixed, the power per information bit, which is essentially necessary, may degrade.

Also, the importance level of downlink control information is generally higher than uplink control information. That is, this is because downlink control information is used to report not only resource allocation information of downlink data channels but also scheduling information of other important information (e.g., paging information or broadcast information). Therefore, it is desired that the frequency of zero padding with respect to downlink control information becomes less.

Here, the frequency diversity effect obtained by PDCCH depends on the bandwidth of a downlink component band. Therefore, in a downlink component band of a narrower bandwidth, the frequency diversity effect is small, and, consequently, factors to degrade the quality are demanded to be removed as much as possible. However, regarding zero padding, there is a higher possibility of zero padding in a downlink component band of a narrower bandwidth.

Such a situation cannot occur because a downlink frequency band is larger than an uplink frequency band in the LTE system not including the concept of carrier aggregation.

By contrast with this, in the LTE+ system which adopts carrier aggregation and, furthermore, associates a plurality of downlink component bands with one uplink component band, a situation frequently occurs in which, if the whole downlink frequency bandwidth is wider than the uplink frequency bandwidth, a downlink component band is narrower than the uplink band, focusing on the component bands.

Also, to avoid zero padding, a method of making the sizes different between uplink control information and downlink control information is possible. However, in this case, the terminal side needs to perform blind decoding of two items of control information with different information bits. Therefore, a problem arises that the number of times of blind decoding increases and therefore the circuit scale increases.

By contrast with this, with the present embodiment, in a PDCCH placed in a downlink component band in which PHICH resources are not placed, only downlink resource allocation information of downlink data is assigned, and zero padding is not performed, so that it is possible to reduce degradation in essentially necessary power per information bit.

Thus, according to the present embodiment, in addition to the effect of above Embodiment 1, uplink resource allocation information is not transmitted in a downlink component band in which PHICH resources are not placed, it is possible to avoid zero padding performed to adjust the information size of resource allocation information of downlink data to the information size of resource allocation information of uplink data.

By this means, unnecessary data transmission is not performed, so that it is possible to improve essentially necessary power per information bit.

Also, with the present embodiment, a terminal is designed to decide whether or not zero padding is necessary upon performing blind decoding, based on whether or not PHICH resources are present, but, actually, an SCH and BCH for an LTE terminal to include LTE terminals are placed in a component band in which PHICH resources are present. Therefore, the terminal may decide whether or not zero padding is necessary, based on whether or not an SCH/BCH to include LTE terminals is present.

Also, with the present embodiment, although zero padding to insert "0" is performed to make the information sizes equal, the present embodiment is not limited to this, and it is equally possible to make the information sizes equal by attaching an arbitrary redundant bit different from "0."

Also, with the present embodiment, format 0 is not decided in a component band in which PHICH resources are not placed, so that it is possible to reduce type information bits of resource allocation information included in the PDCCH in a component band in which PHICH resources are not placed. That is, it is possible to improve the power efficiency in PDCCH transmission. Also, if a part corresponding to the type information bits is not reduced, a part corresponding to the type information bits of resource allocation information adopts a fixed vale (i.e., type information indicating downlink assignment) in a component band in which PHICH resources are not placed, so that the terminal side can use that part as a partial parity bit.

Embodiment 4

The present embodiment differs from Embodiment 3 only in that the information sizes may be different between downlink resource allocation information and uplink resource allocation information even in a case where the uplink bandwidth and the downlink bandwidth are equal.

That is, a case has been described above with Embodiment 3 where, if the uplink bandwidth and the downlink bandwidth are the same, the information sizes are the same between uplink resource allocation information and downlink resource allocation information in a downlink component band in which PHICH resources are placed. By contrast with this, with the present embodiment, even if the uplink bandwidth and the downlink bandwidth are the same, the information sizes are substantially the same but are not always the same between downlink resource allocation information and uplink resource allocation information. Also, when the difference between the uplink bandwidth and the downlink bandwidth becomes larger, the difference of information sizes between downlink resource allocation information and uplink resource allocation information becomes larger.

Therefore, with the present embodiment, to maintain the information sizes the same between downlink resource allocation information and uplink resource allocation information, if the information sizes are different between the downlink resource allocation information and the uplink resource allocation information, similar to Embodiment 3, zero information is attached to resource allocation information assigned to a PDCCH in a partial downlink component band (0 padding).

The present embodiment will be explained below in detail.

Here, the basic configurations of a terminal and base station according to the present embodiment are the same as the configurations of the terminal and base station explained in Embodiment 3. Therefore, the terminal and base station according to the present embodiment will be also explained using FIG. 7 and FIG. 8.

PDCCH receiving section 802 of terminal 800 (FIG. 7) according to the present embodiment performs blind decoding of the PDCCH signal in each downlink component band received as input from demultiplexing section 106, using the information size of resource allocation information supporting the bandwidth of each downlink component band, the information size of resource allocation information supporting the bandwidth of the uplink component band and the terminal ID of that terminal. Here, the PDCCH signal is placed in each of the plurality of downlink component bands.

That is, first, PDCCH receiving section 802 specifies the CRC bit corresponding part included in each PDCCH signal. At this time, in base station 900 (FIG. 8), the information size needs to be adjusted by zero padding. Consequently, PDCCH receiving section 802 specifies the CRC bit corresponding part in the PDCCH signal of the reference component band, using the larger information size (payload size) between the information size of downlink resource allocation information determined by the bandwidth of the reference component band and the information size of uplink resource allocation information determined by the bandwidth of the uplink component band associated with the reference component band. In contrast, only downlink resource allocation information is included in a downlink component band different from the reference component band. Therefore, similar to Embodiment 3, PDCCH receiving section 802 specifies the CRC bit corresponding part in a downlink component band different from the reference component band, using the information size corresponding to the bandwidth of the downlink component band.

In contrast, control section 901 of base station 900 (FIG. 8) according to the present embodiment outputs, to padding section 903 via PDCCH generating section 902, information size comparison information indicating the magnitude relationship between the information size of downlink resource allocation information determined by the bandwidth of the reference component band and the information size of uplink resource allocation information determined by the bandwidth of the uplink component band.

Padding section 903 attaches zero information to information of the smaller information size between the downlink resource allocation information and the uplink resource allocation information, in a PDCCH signal received as input from PDCCH generating section 902, until these sizes are equal (zero padding). At this time, padding section 903 decides to which of the downlink resource allocation information and uplink resource allocation information zero information is attached, based on the information size comparison information.

Next, similar to Embodiment 3, operations of terminal 800 and base station 900 will be explained using FIG. 9. FIG. 9 shows an example of placing a PHICH and PDCCH.

Similar to Embodiment 3, base station 900 places PHICH resources only in a partial downlink component band of a plurality of downlink component bands, and transmits uplink resource allocation information of uplink data using a PDCCH only from the partial downlink component band in which the PHICH resources are placed. That is, base station 900 does not use PDCCH resources to transmit uplink resource allocation information of uplink data in a component band in which PHICH resources are not placed. Therefore, PDCCH receiving section 802 of terminal 800 obtains downlink resource allocation information from each of the plurality of downlink component bands and obtains uplink resource allocation information from the partial downlink component band in which PHICH resources are placed.

Also, similar to above Embodiment 1, PDCCH receiving section 802 of terminal 800 performs blind decoding of a PDCCH signal received as input from demultiplexing section 106. The PDCCH information bit size required for blind decoding is determined by: a decision result as to whether or not PHICH resources are placed in a downlink component band to which a PDCCH is transmitted; the information size of downlink resource allocation information determined by the bandwidth of the downlink component band in which PDCCH resources are placed; and the information size of uplink resource allocation information determined by the bandwidth of the uplink component band associated with the downlink component band.

That is, in a downlink component band in which PHICH resources are not placed, PDCCH receiving section 802 determines the information size used for blind decoding of PDCCH, only by the information size of downlink resource allocation information determined by the bandwidth of the downlink component band.

By contrast with this, in a downlink component band in which PHICH resources are placed, PDCCH receiving section 802 determines the information size used for blind detection of PDCCH, with reference to the larger information size between the information size of downlink resource allocation information determined by the bandwidth of the downlink component band and the information size of uplink resource allocation information determined by the bandwidth of the uplink component band associated with the downlink component band. Here, when the bandwidth of a component band becomes narrower, the number of bits required to indicate the frequency position of assigned link resources becomes smaller. Therefore, for example, when the bandwidth of an uplink component band is wider than the bandwidth of a downlink component band, the information size of uplink resource allocation information is larger than the information size of downlink resource allocation information in most cases. Therefore, if the information size of uplink resource allocation information is larger than the information size of downlink resource allocation information, PDCCH receiving section 802 decides that "0" is inserted (zero padding) in the downlink resource allocation information. By this means, it is possible to presume that the uplink resource allocation information and downlink resource allocation information have the same information size. By this zero padding, the information size of the uplink resource allocation information and the information size of the downlink resource allocation information are the same, similar to Embodiment 3, terminal 800 can try blind decoding of these items of information at the same time, so that it is possible to reduce the circuit scale of the terminal. Also, it is possible to decide whether information subjected to successful blind decoding is uplink resource allocation information of uplink data or downlink resource allocation information of downlink data, by one-bit "uplink/downlink assignment information decision flag" included in the information bits.

Here, in a case where zero padding is performed, focusing on a pair of a certain downlink component band and uplink component band, if the information size of downlink resource allocation information determined by the bandwidth of the downlink component band is smaller than the information size of uplink resource allocation information determined by the bandwidth of the uplink component band, regarding this pair, zero information is attached to the downlink resource allocation information of the smaller information size until the information size of the downlink resource allocation information and the information size of the uplink resource allocation information are equal. However, zero padding is performed for size adjustment, and, consequently, zero information contains no particular meaning. That is, a signal that is not essentially necessary is included in downlink control information, and, consequently, if the entire power is fixed, the power per information bit, which is essentially necessary, may degrade.

Also, the importance level of downlink control information is generally higher than uplink control information. This is because downlink control information is used to report not only resource allocation information of downlink data channels but also scheduling information of other important information (e.g., paging information or broadcast information). Therefore, it is desired that the frequency of zero padding with respect to downlink control information becomes less.

Here, the frequency diversity effect obtained by PDCCH depends on the bandwidth of a downlink component band. Therefore, in a downlink component band of a narrower bandwidth, the frequency diversity effect is small, and, consequently, factors to degrade the quality are demanded to be removed as much as possible. However, regarding zero padding, there is a higher possibility of zero padding in a downlink component band of a narrower bandwidth.

Such a situation cannot occur because a downlink frequency band is larger than an uplink frequency band in the LTE system not including the concept of carrier aggregation. By contrast with this, in the LTE+ system which adopts carrier aggregation and, furthermore, associates a plurality of downlink component bands with one uplink component band, a situation frequently occurs in which, if the whole downlink frequency bandwidth is wider than the uplink frequency bandwidth, a downlink component band is narrower than the uplink band, focusing on the component bands.

Also, to avoid zero padding, a method of making the sizes different between uplink control information and downlink control information is possible. However, in this case, the terminal side needs to perform blind decoding of two items of control information with different information bits. Therefore, a problem arises that the number of times of blind decoding increases and therefore the circuit scale increases.

By contrast with this, with the present embodiment, similar to Embodiment 3, only downlink resource allocation information of downlink data is assigned and zero padding is not performed in a PDCCH placed in a downlink component band in which PHICH resources are not placed, so that it is possible to control the decrease in essentially necessary power per information bit.

By this means, according to the present embodiment, similar to Embodiment 3, uplink resource allocation information is not transmitted in a downlink component band in which PHICH resources are not placed, so that it is possible to avoid performing zero padding to match the information size of resource allocation information of downlink data to the information size of resource allocation information of uplink data. By this means, transmission of unnecessary data is not performed, so that it is possible to improve essentially necessary power per information bit.

Also, with the present embodiment, a terminal decides whether or not zero padding is necessary upon performing blind decoding, based on whether or not PHICH resources are present, but, actually, an SCH and BCH for LTE terminals to include LTE terminals are assigned to a component band in which PHICH resources are present. Therefore, the terminal may decide whether or not zero padding is necessary, based on whether or not an SCH/BCH to include LTE terminals is present.

Also, with the present embodiment, although zero padding to insert "0" is performed to make the information sizes the same, the present embodiment is not limited to this, and it is equally possible to make the information sizes the same by attaching arbitrary information bits other than "0."

Also, with the present embodiment, format 0 cannot be decided in a component band in which PHICH resources are not placed, so that it is possible to reduce type information bits of resource allocation information included in a PDCCH, in a component band in which PHICH resources are not placed. That is, it is possible to improve the power efficiency in PDCCH transmission. Also, in a case where a part corresponding to the type information bits is not reduced, the type information bit corresponding part of resource allocation information has a fixed value (i.e., type information indicating downlink allocation) in a component band in which PHICH resources are not placed, so that it is possible to use this part as part of parity bits on the terminal side.

Embodiment 5

The present embodiment differs from Embodiment 1 in forming the asymmetric carrier aggregation between uplink and downlink every terminal, using a pair of downlink component bands and a pair of uplink component bands.

Figure 10:
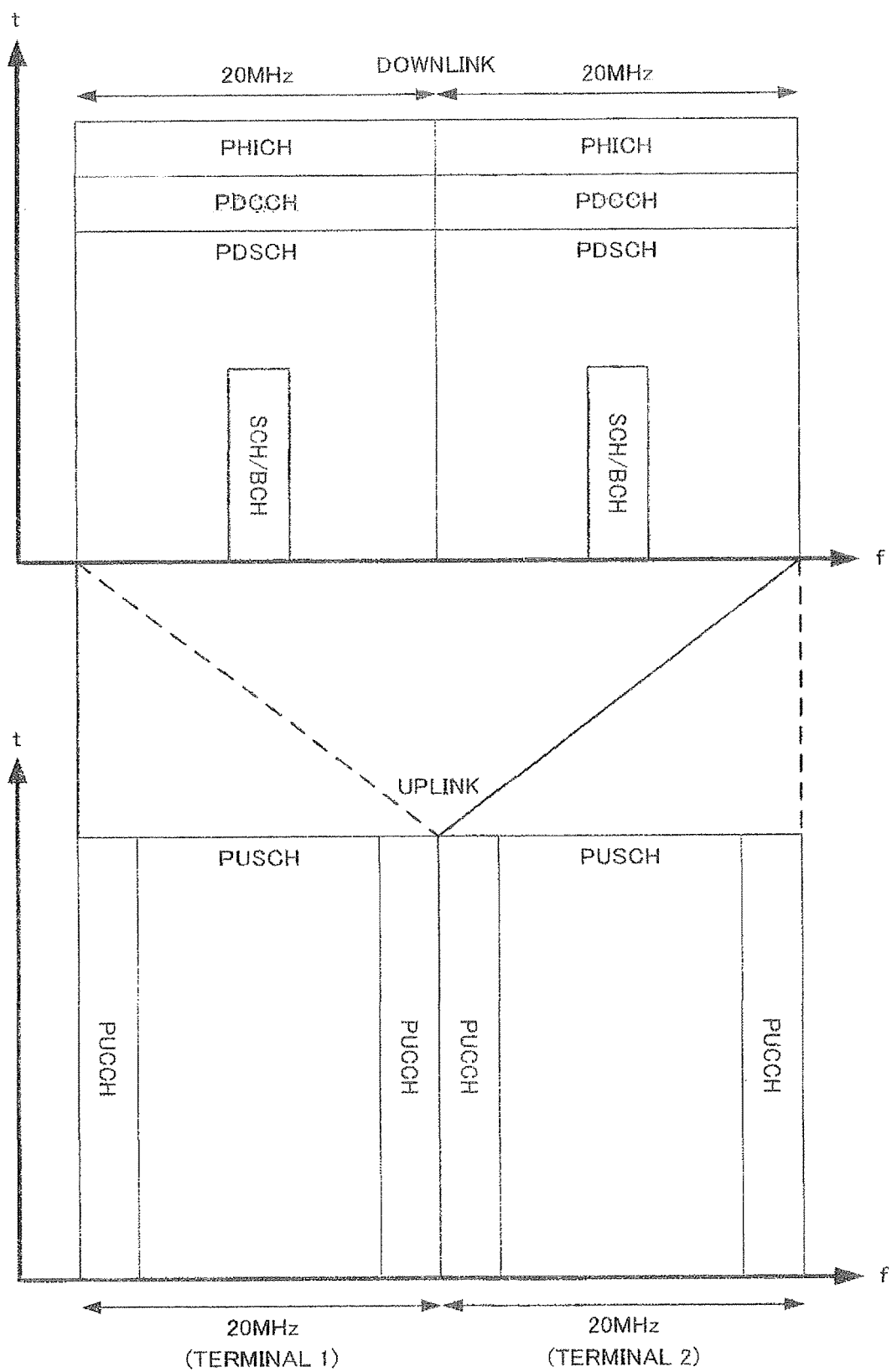
FIG. 10 shows component bands managed by a base station according to Embodiment 5 of the present invention.

For example, as shown in FIG. 10, a base station manages two downlink component bands and two uplink component bands.

However, taking into account the power consumption in transmission of a terminal and capability of an RF transmission circuit, the base station sets two downlink component bands to one terminal in downlink (i.e., the reception band of the terminal) while setting only one uplink component band to the terminal in uplink (i.e., the transmission band of the terminal).

Also, in FIG. 10, two downlink component bands and one uplink component band on the lower frequency side (associated with solid lines shown in FIG. 10) are set in terminal 1, and the same two downlink component bands as those of terminal 1 and one uplink component band on the higher frequency side (associated with dotted lines shown in FIG. 10) are set in terminal 2.

That is, in terminal 1 and terminal 2 of FIG. 10, although the same downlink component bands are set in downlink, respective uplink component bands are set in uplink.

In this case, if a base station transmits uplink resource allocation information using any of PDCCH's placed in the downlink component bands, each terminal transmits uplink data based on the RB number of a PUSCH corresponding to uplink allocation information for that terminal, in the set uplink component band. That is each terminal receives a signal transmitted using one of the two downlink component bands in downlink while transmitting a signal using only one uplink component band in uplink.

Also, as shown in FIG. 10, when the number of component bands set in each terminal varies between uplink and downlink (asymmetric), as described above (in FIG. 1), one PUSCH resource may be associated with a plurality of PHICH resources placed in each downlink component band.

By this means, although PHICH resources may be wasted, it is possible to prevent the contention for PHICH resource and significant degradation in the system capability.

However, as shown in FIG. 10, in a case where the numbers of component bands set in each terminal are asymmetric between uplink and downlink, and where carrier aggregation is formed in which the position of the uplink component band set in each terminal varies, PUSCH resources placed in the different uplink component bands may be associated with the same PHICH resources. For example, in FIG. 10, PUSCH resources placed in respective uplink component bands (on the lower frequency side and the higher frequency side) set for terminal 1 and terminal 2, and PHICH resources placed in the same downlink component band set for terminal 1 and terminal 2, can be associated with each other and used. In this case, a state occurs where the same PHICH resources are used between terminal 1 and terminal 2, that is, where the contention for PHICH resources is caused.

Here, in the LTE system, the number of uplink component bands and the number of downlink component bands set for one LTE terminal are both one, and the symmetry is secured in the numbers of component bands between uplink and downlink. Therefore, in the LTE system, it is possible to always associate PUSCH resources and PHICH resources on a one-to-one basis. Therefore, to reduce the overhead of signaling required to report PHICH resources for terminals, PHICH resources and the RB numbers of PUSCH's are associated. That is, in the LTE system, PUSCH resources placed in respective uplink component bands are associated with PHICH resources placed in respective downlink component bands. In other words, the contention for the same PUSCH resources is not caused between PUSCH resources placed in respective uplink component bands. Also, in the LTE system, information indicating the uplink component band associated with each downlink component band is broadcasted to terminals using the BCH placed in each downlink component band.

Therefore, with the present embodiment, an LTE+ terminal extracts a response signal for uplink data of that terminal, from a PHICH placed in a downlink component band in which a BCH to broadcast information (including the frequency position of an uplink component band and the frequency bandwidth of the uplink component band) related to an uplink component band used by that terminal (i.e., uplink component band set for that terminal) is placed, among a plurality of downlink component bands.

This will be explained below in detail. Also, basic configurations of a terminal and base station according to the present embodiment are the same as the configurations of the terminal and base station explained in Embodiment 1. Therefore, the terminal according to the present embodiment will also be explained using FIG. 3 and FIG. 4.

That is, terminal 100 (FIG. 3) according to the present embodiment is a type-2 LTE+ terminal and can perform communication using a plurality of downlink component bands at the same time. Also, base station 200 (FIG. 4) according to the present embodiment is an LTE+ base station.

Also, as shown in FIG. 10, an SCH and BCH are placed in each downlink component band.

Upon receiving a PHICH signal, demultiplexing section 106 of terminal 100 extracts a response signal for uplink data for that terminal from the demultiplexed PHICH signal, according to a downlink component band and PHICH resource number indicated by resource control information received as input from resource control section 108.

To be more specific, demultiplexing section 106 extracts a response signal for uplink data for that terminal from a PHICH placed in a downlink semi-reference component band for that terminal, among a plurality of downlink component bands. Here, a downlink semi-reference component band is a downlink component band mapping a BCH that broadcasts information on an uplink component band in which the uplink component band is utilized by the subject terminal by mapping uplink data of the subject terminal. Then, demultiplexing section 106 outputs the PHICH signal to PHICH signal receiving section 109.

Broadcast information receiving section 107 reads the content of BCH's placed in each of a plurality of downlink component bands, received as input from demultiplexing section 106, and obtains information of the uplink component band associated with each downlink component band.

Then, broadcast information receiving section 107 specifies a downlink component band in which a BCH to broadcast information related to an uplink component band set for the subject terminal, among the plurality of downlink component bands, and defines this downlink component band as a downlink semi-reference component band for that terminal.

Also, broadcast information receiving section 107 associates the RB number of a PUSCH and the PHICH resource number of a PHICH, and obtains PHICH resource information indicating the number of PHICH resources. Then, broadcast information receiving section 107 outputs downlink semi-reference component band information indicating the downlink semi-reference component band and the PHICH resource information to resource control section 108.

Resource control section 108 specifies a PHICH to which a response signal for uplink data from the subject terminal is assigned, based on the downlink semi-reference component band information and PHICH resource information received as input from broadcast information receiving section 107 and uplink resource allocation information received as input from PDCCH receiving section 110. Here, the PHICH to which the response signal for the uplink data from terminal 100 is placed in the downlink semi-reference component band for terminal 100 among the plurality of downlink component bands. Therefore, resource control section 108 specifies the downlink component band in which the PHICH is placed, based on the PHICH resource information and downlink semi-reference component band information. Further, based on the uplink resource allocation information, resource control section 108 specifies the PHICH resource number of the PHICH associated with the RB number of a PUSCH used to transmit uplink data of the subject terminal. Then, resource control section 108 outputs resource control information indicating the specified downlink component band and PHICH resource number of the PHICH, to demultiplexing section 106.

On the other hand, control section 201 of base station 200 (FIG. 4) assigns a response signal for the uplink data from each terminal, to a PHICH placed in the downlink semi-reference component band of each terminal, among a plurality of downlink component bands. That is, regardless of in which downlink component band the uplink resource allocation information assigned for a terminal having transmitted uplink data is placed, control section 201 assigns a response signal for the uplink data from each terminal, to a PHICH placed in the downlink semi-reference component band of each terminal.

Next, operations of terminal 100 and base station 200 will be explained in detail.

Figure 11:
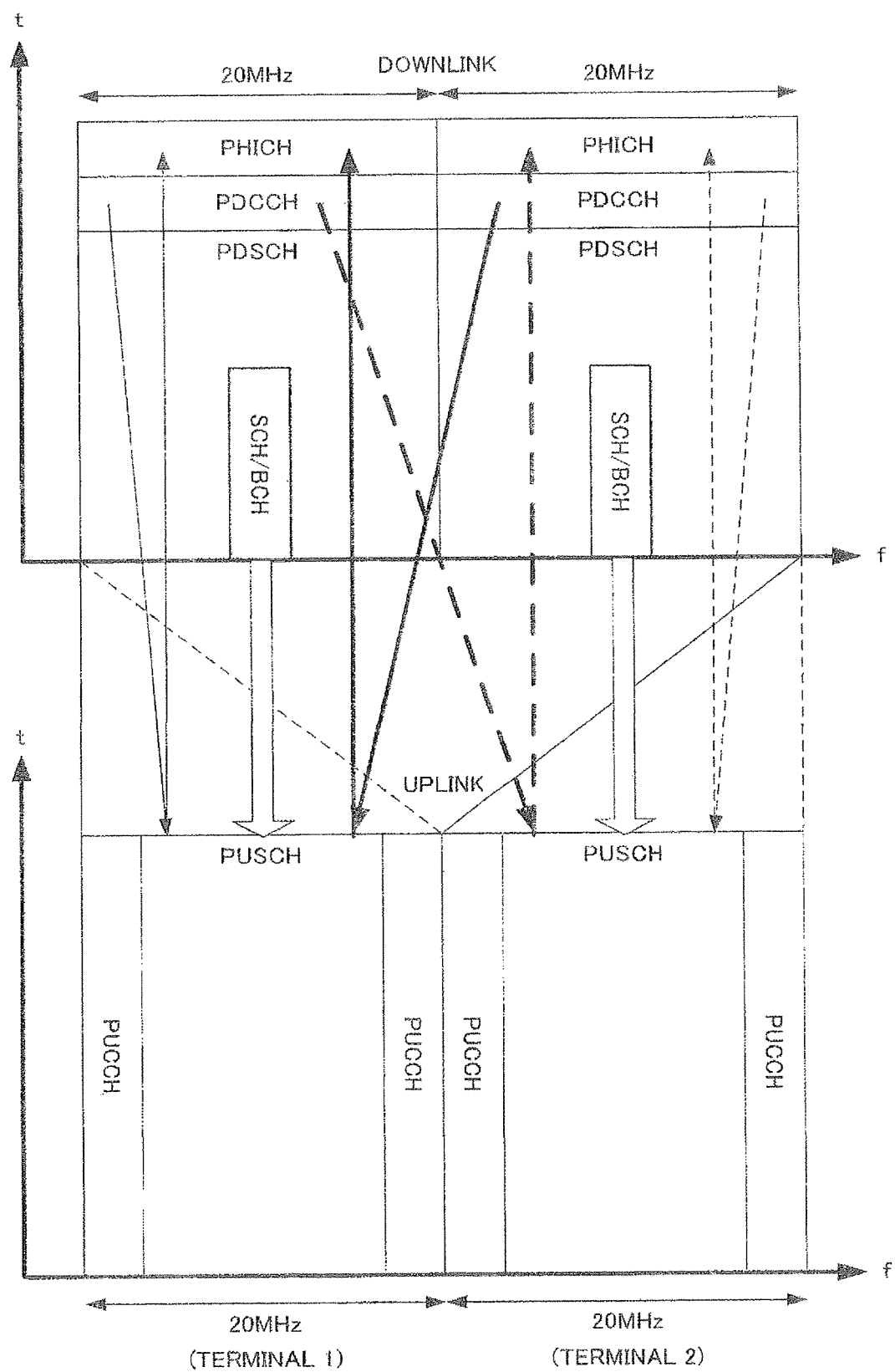
FIG. 11 shows an example of PHICH and PDCCH placement according to Embodiment 5 of the present invention.

In the following explanation, as shown in FIG. 11, a PDCCH, PHICH and SCH/BCH are placed in each of two downlink component bands.

Also, terminal 1 and terminal 2 (LTE+ terminals) shown in FIG. 11 each have the same configuration as that of terminal 100 shown in FIG. 3.

Also, base station 200 determines which downlink component band and uplink component band are set in every terminal. Here, as shown in FIG. 11, the number of downlink component bands set in each terminal is two, and the number of uplink bands is one, which is smaller than the number of downlink component bands by one. Therefore, as shown in FIG. 11, base station 200 sets two downlink component bands and one uplink component band on the lower frequency side (associated with solid lines shown in FIG. 11) to terminal 1, and sets the same downlink component bands as those of terminal 1 and one uplink component band (associated with dotted lines shown in FIG. 11) to terminal 2. That is, although base station 200 can use two downlink component bands and two uplink component bands, each terminal can use only two downlink component bands and one uplink component band.

Also, although base station 200 reports set downlink component bands and uplink component band to each terminal, in the set component bands, a downlink signal is not necessarily transmitted to each terminal in all subframes, and transmission of an uplink signal is not necessarily commanded to each terminal. That is, the downlink component bands set for each terminal show in which component band a downlink control signal and downlink data for the terminal can be mapped, and the uplink band set for each terminal shows which uplink component band has to be used in a case where a terminal receives an uplink control signal.

As shown in the upper part of FIG. 11, each LTE+ terminal (terminal 1 and terminal 2) uses PDCCH's placed in two downlink component bands. In contrast, each LTE+ terminal (terminal 1 and terminal 2) uses only a PHICH placed in the downlink semi-reference component band for each terminal among the two downlink component bands. Here, the semi-reference component band for terminal 1 is the downlink component band on the lower frequency band shown in FIG. 11, in which a BCH to broadcast information related to an uplink component band used by terminal 1 (i.e., uplink component band on the lower frequency side shown in FIG. 11) is placed. Also, the downlink semi-reference component band for terminal 2 is the downlink component band on the higher frequency side shown in FIG. 11, in which a BCH to broadcast information related to an uplink component band used by terminal 2 (i.e., uplink component band on the higher frequency side shown in FIG. 11) is placed. That is, terminal 1 and terminal 2 (LTE+ terminals) shown in FIG. 11 each specify a downlink component band in which a BCH for LTE to broadcast information related to an uplink component band set for the subject terminal is placed, among BCH's for LTE placed in the plurality of downlink component bands, and determines the specified downlink component band as a downlink semi-reference component band for the subject terminal.

A case will be explained below where base station 200 (LTE+ base station) and terminal 100 (LTE+ terminal) perform communication.

First, control section 201 of base station 200 assigns uplink resource allocation information and downlink resource allocation information to be reported to terminal 100, to one of PDCCH's placed in two downlink component bands shown in the upper part of FIG. 11.

Demultiplexing section 106 of terminal 100 demultiplexes PDCCH signals placed in the two downlink component bands shown in the upper part of FIG. 11, from a reception signal, and PDCCH receiving section 110 obtains resource allocation information (uplink resource allocation information and downlink resource allocation information) for the subject terminal, from the demultiplexed PDCCH signals.

Then, mapping section 115 of terminal 100 maps transmission data (uplink data) on PUSCH's placed in the uplink component bands shown in the lower part of FIG. 11, according to the obtained uplink resource allocation information. Here, which uplink component band is set is reported in advance from base station 200 to terminal 100.

Next, response signal generating section 204 of base station 200 generates a response signal (ACK signal or NACK signal) for uplink data from terminal 100. Also, control section 201 of base station 200 assigns the response signal for the uplink data from terminal 100, to a PHICH placed in a downlink semi-reference component band for terminal 100. Further, control section 201 specifies a PHICH of the PHICH resource number associated with the RB number of a PUSCH assigned to the uplink data, among PHICH's placed in the downlink band which is the downlink semi-reference component band for terminal 100.

That is, as shown in FIG. 11, regardless of in which of PDCCH's placed in two downlink component bands the uplink resource allocation information for terminal 100 is placed, control section 201 of base station 200 performs assignment in a PHICH placed in the downlink component band which is the downlink semi-reference component band for each terminal. For example, as shown with solid arrows in FIG. 11, even in a case where base station 200 transmits uplink resource allocation information to terminal 1 (LTE+ terminal) using a PDCCH placed in the downlink component band on the higher frequency side, control section 201 assigns a response signal for uplink data transmitted based on the resource allocation information, to a PHICH placed in the downlink component band on the lower frequency side (i.e., downlink semi-reference component band for terminal 1). Also, as shown in dotted lines in FIG. 11, the same applies to terminal 2.

Also, resource control section 108 of terminal 100 selects a downlink semi-reference component band for that terminal, as a downlink component band to which a response signal for uplink data is assigned. For example, as shown in FIG. 11, regardless of in which of two downlink component bands a PDCCH assigned resource allocation information for terminal 1 is placed, in the same way as in control section 201 of base station 200, resource control section 108 of terminal 1 controls a response signal for uplink data to be extracted from a PHICH placed in the downlink component band on the lower frequency side (i.e., a downlink semi-reference component band for terminal 1). Further, resource control section 108 calculates the PHICH resource number of the PHICH associated with the RB number of a PUSCH on which uplink data is mapped. Then, demultiplexing section 106 extracts the response signal for the uplink data from the PHICH, which is placed in the downlink component band selected in resource control section 108 and which has the PHICH resource number calculated in resource control section 108.

In this way, in a case where asymmetric carrier aggregation is formed for each LTE+ terminal between uplink and downlink, a downlink semi-reference component band in which a PHICH assigned a response signal for uplink data from an LTE+ terminal is placed, is determined based on a BCH for the LTE terminal. By this means, in a case where different uplink component bands are assigned between LTE+ terminals, each LTE+ terminal can use PHICH resources placed in different downlink component bands (downlink semi-reference component bands) associated with respective uplink component bands. Therefore, even in a system (e.g., LTE+ system) in which the number of uplink component bands and the number of downlink component bands set for LTE+ terminals is asymmetric, it is possible to avoid the contention for PHICH resources between LTE+ terminals, so that it is possible to prevent the degradation in the system efficiency.

Also, a PDCCH to which resource allocation information for a certain terminal is placed in both two downlink component bands. Therefore, even if PHICH resources placed in one downlink component band are not sufficient, base station 200 can use a PDCCH placed in the other downlink component band, so that it is possible to operate PDCCH's efficiently.

Thus, according to the present embodiment, an LTE+ base station assigns uplink resource allocation information and downlink resource allocation information to PDCCH's placed in a plurality of downlink component bands, and assigns a response signal for uplink data to a PHICH placed in the downlink semi-reference component band for each terminal among the plurality of downlink component bands. By this means, even in a case where the LTE+ base station uses an uplink component band and downlink component band with the symmetry unique to each LTE+ terminal (e.g., in a case of using different uplink component bands between LTE+ terminals), it is possible to prevent the contention for PHICH resources between different LTE+ terminals and use the PHICH resources efficiently. Therefore, according to the present embodiment, even in a case where asymmetric carrier aggregation is independently formed for each terminal between uplink and downlink, it is possible to improve the efficiency of frequency use.

Embodiment 6

The present embodiment differs from Embodiment 5 in forming discontinuous reception (DRX) independently for each component band, to reduce the power consumption of a terminal.

Although each terminal continuously receives a setting report of two downlink component bands from a base station, it is rare in fact that there are many consecutive signals to be transmitted in the time domain from the base station to each terminal, so that it is sufficient for the terminal to receive only one downlink component band in one time. Therefore, it is possible to reduce the power consumption in a terminal by determining in advance DRX operations between a base station and terminal in a certain component band, where the DRX operations represent operations in which the terminal receives a signal in the component band in partial time (period) and does not receive a signal in the component band in other time (period) than the partial time. Here, focusing on one component band, a cycle formed with "a period of receiving a signal" and "a period of stopping receiving a signal," is called "DRX cycle." The DRX cycle is repeated in, for example, several tens of ms cycles.

In this case, the terminal performs DRX independently for every downlink component band. Here, for example, in FIG. 11 (Embodiment 5), even in a case where uplink resource allocation information for terminal 1 is transmitted using a PDCCH placed in the downlink component band on the higher frequency side, the base station has to transmit a response signal using a PHICH placed in the downlink component band on the lower frequency side (i.e., semi-reference component band for terminal 1). However, depending on the DRX cycle, a case is possible where, even if the terminal can receive a signal in the downlink component band on the higher frequency side, the terminal cannot receive a response signal because the downlink component band on the lower frequency side is in a state of DRX (i.e., while stopping reception).

Figure 12:
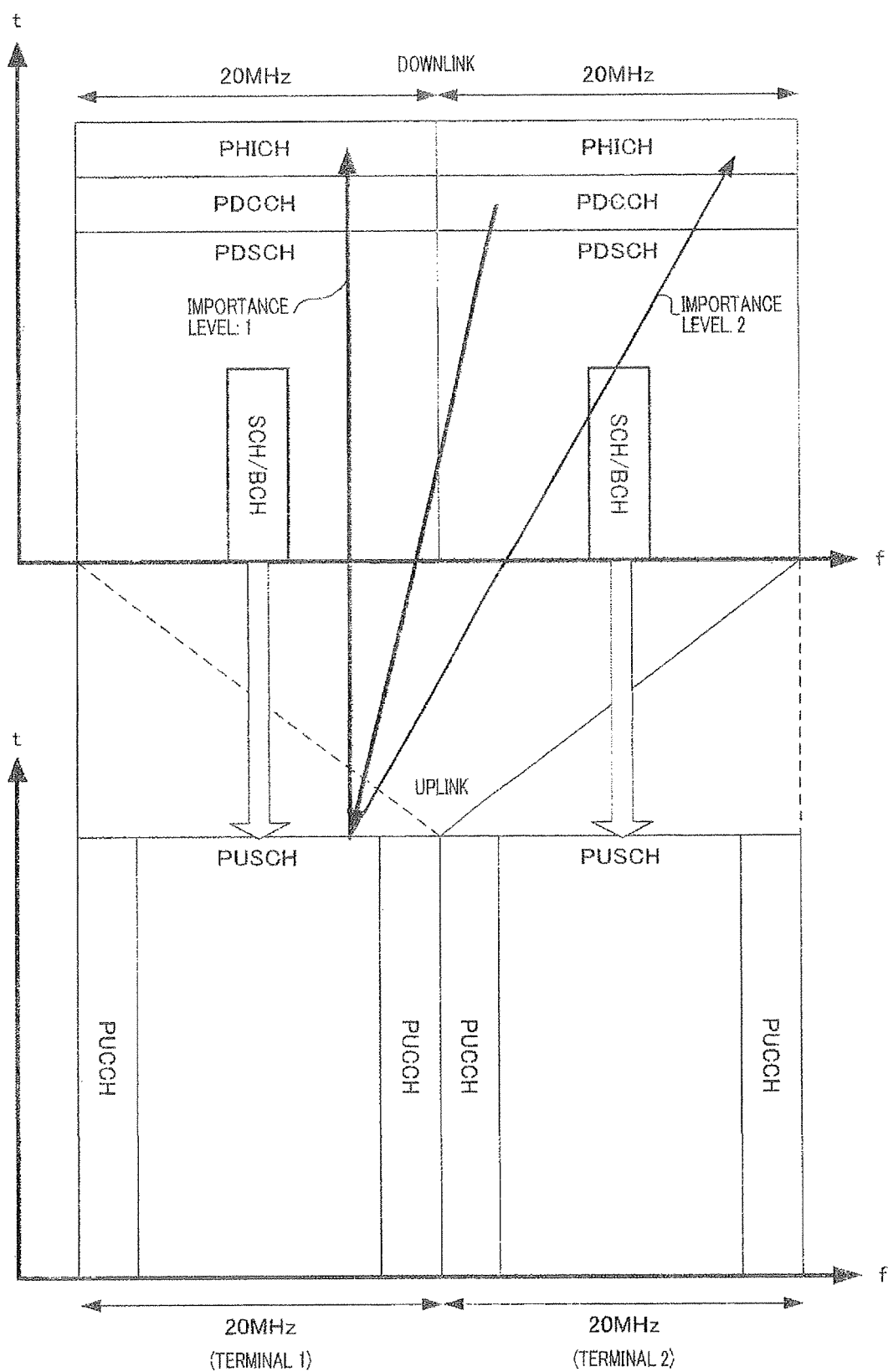
FIG. 12 shows an example of PHICH and PDCCH placement according to Embodiment 6 of the present invention.

Therefore, with the present embodiment, as shown in FIG. 12, the importance level is assigned to downlink component bands in which a PHICH assigned a response signal for each terminal is placed.

This will be explained below in detail. Similar to Embodiment 5, each terminal according to the present embodiment specifies a downlink component band in which a PHICH assigned a response signal for the subject terminal is placed, based on information of a semi-reference component band for that terminal. Here, if the semi-reference component band is in a state of DRX at the reception timing of a response signal, the terminal determines a downlink component band in which a PDCCH used to transmit uplink resource allocation information is placed, as a downlink component band in which a PHICH used to receive the response signal is placed.

For example, as shown in FIG. 12, in a case where uplink resource allocation information is transmitted using a PDCCH placed in the downlink component band on the higher frequency side, normally, terminal 1 extracts a response signal for uplink data from a PHICH placed in the downlink component band on the lower frequency side, which is a downlink semi-reference component band for the subject terminal, in the same way as in Embodiment 5. However, in a case where the component band on the lower frequency side shown in FIG. 12 is in a state of DRX, terminal 1 extracts a response signal for uplink data from a PHICH placed in the same downlink component band on the higher frequency side as that of a PDCCH used to transmit uplink resource allocation information for that terminal. Here, similar to Embodiment 5, the PHICH resource number is determined in association with the RB number of the PUSCH used to transmit the uplink data.

That is, in FIG. 12, terminal 1 gives an importance level of the first place to a PHICH placed in the downlink component band on the lower frequency side (i.e., downlink semi-reference component band for terminal 1), and gives an importance level of a second place to a PHICH placed in the downlink component band on the higher frequency side. Then, terminal 1 specifies a PHICH to which a response signal for uplink data from that terminal is assigned, according to the importance level of the PHICH and the state of DRX. In FIG. 12, terminal 2 also sets the importance levels of PHICH's in the same way (not shown).

Thus, according to the present embodiment, a terminal gives an importance level to PHICH's placed in a plurality of downlink component bands assigned to that terminal as downlink component bands in which PHICH's to receive a response signal are placed. Basically, the terminal receives uplink resource allocation information using a PDCCH placed in a downlink component band that is not in a state of DRX, and, consequently, upon receiving a response signal for uplink data, there is a high possibility that a downlink component band in which the PDCCH is placed is not in a state of DRX. Therefore, according to the present embodiment, in a case where DRX is performed independently every component band, it is possible to reduce the overhead of PHICH resources and prevent a terminal from not being able to receive a PHICH to which a response signal for that terminal is assigned.

Also, a case has been described above with the present embodiment where, upon receiving a response signal using a PHICH resource (e.g., PHICH of an importance level of "2" shown in FIG. 12) placed in the same downlink component band as that of a PDCCH used to receive uplink resource allocation information, a terminal extracts the response signal from the PHICH of the PHICH resource number associated with the RB number of the PUSCH. However, according to the present invention, a PHICH from which a terminal extracts a response signal is not limited to a PHICH associated with the RN number of a PUSCH, and it is equally possible to use a PHICH separately reported to the terminal. There is a very low possibility that a PHICH of a lower importance level (PHICH with an importance level of "2" in FIG. 12) is used. Therefore, if a base station reports a PHICH resource with a lower importance level to a terminal, this PHICH resource is shared with other terminals by easy scheduling control on the base station side, so that the overhead of this PHICH resource becomes extremely small.

Embodiments of the present invention have been described above.

Also, Embodiments 1 to 4 of the present invention may be applied only to a case where the communication bandwidths are asymmetric between uplink and downlink, that is, where the number of uplink component bands is smaller than the number of downlink component bands.

Figure 13:
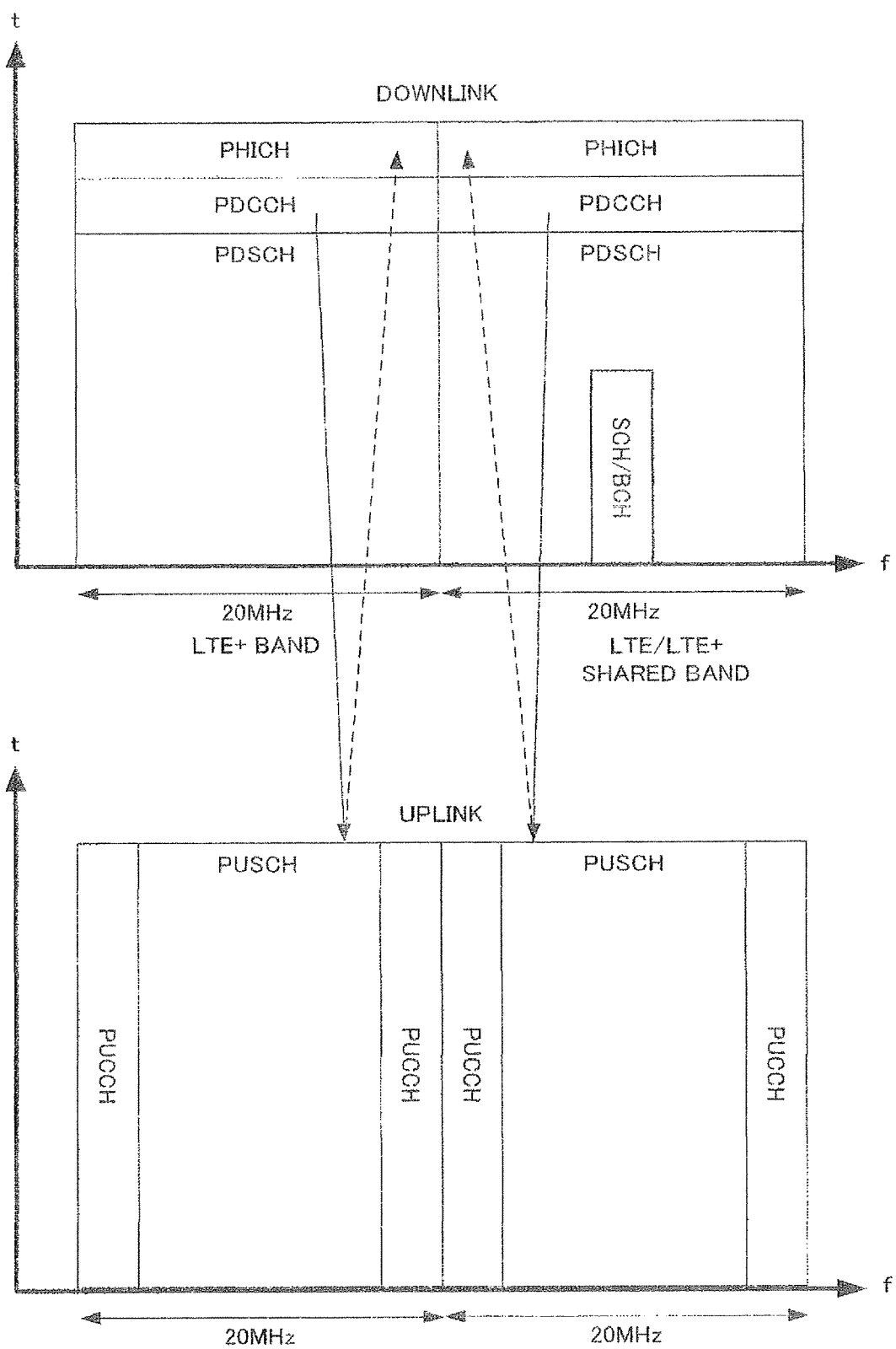
FIG. 13 shows a variation of the present invention.

For example, in a case where the communication bandwidths are symmetric between uplink and downlink (where the ratio of communication bandwidths is 1:1 between uplink and downlink), as shown in FIG. 13, a terminal selects a PHICH placed in the same downlink component band as a downlink component band in which a received PDCCH is placed. In contrast, in a case where communication bandwidths are asymmetric between uplink and downlink, similar to the above embodiments (e.g., FIG. 5 and FIG. 6), a terminal selects a PHICH placed in a partial downlink component band (the LTE/LTE+ coexisting band). However, although a case has been described with FIG. 13 where the partial component band is the LTE+ band, the present invention is equally applicable to a case where all component bands are LTE/LTE+ coexisting bands in FIG. 13.

Also, although channel allocation of a downlink response signal for uplink data have been described with Embodiments 1, 2, 5 and 6 of the present invention, the present invention is equally applicable to channel allocation of an uplink response signal for downlink data. For example, in a case where one downlink component band is associated with a plurality of uplink component bands, a terminal assigns an uplink response signal to uplink response signal resources placed in a same number of partial uplink component bands (e.g., LTE/LTE+ coexisting band) as the number of downlink component bands among the plurality of uplink component bands. That is, regardless of in which uplink component bands a PDCCH or PDSCH placed in one downlink component band is received, the terminal assigns a response signal for uplink response signal resources placed in the partial uplink component band. Even in this case, it is possible to provide the same effect as in the above embodiments.

Also, although cases have been described above with embodiments where an SCH/BCH is not placed in an LTE+ band, with the present invention, an SCH/BCH that can be received by an LTE+ terminal may be placed in the LTE+ band. That is, with the present invention, regardless of whether or not an SCH/BCH is present, a component band in which an LTE terminal is not contained is referred to as "LTE+ band."

Also, with the above embodiment, for ease of explanation, a PHICH and PDCCH are time-divided for the placement of PHICH and PDCCH (e.g., FIG. 5 and FIG. 6). That is, resources that are orthogonal in the time domain are allocated to a PHICH and
PDCCH, respectively.

However, with the present invention, placement of PHICH and PDCCH is not limited to this. That is, resources having respective frequencies, times or codes, that is, orthogonal resources are assigned to a PHICH and PDCCH, respectively.

Also, although cases have been described above with embodiments where the communication bandwidth of a component band is 20 MHz, the communication bandwidth of a component band is not limited to 20 MHz.

Although example cases have been described above with Embodiments 1 to 4 where the present invention is implemented with hardware, the present invention can be implemented with software.

Furthermore, each function block employed in the description of each of Embodiments 1 to 4 may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2008-205644, filed on Aug. 8, 2008, Japanese Patent Application No. 2008-281390, filed on Oct. 31, 2008, Japanese Patent Application No. 2008-330641, filed on Dec. 25, 2008, including the specifications, drawings and abstracts, are incorporated herein by reference in their entireties.

INDUSTRIAL APPLICABILITY

The present invention is applicable to a mobile communication system, for example.

The invention claimed is:

1. A communication apparatus comprising:
a receiver, which, in operation, (a) receives first downlink resource allocation information for a first downlink component carrier, (b) receives second downlink resource allocation information for a second downlink component carrier, which is different from the first downlink component carrier, (c) receives first downlink data on the first downlink component carrier in accordance with the first downlink resource allocation information, (d) receives second downlink data on the second downlink component carrier in accordance with the second downlink resource allocation information, and (e) receives uplink resource allocation information for an uplink component carrier on one out of the first downlink component carrier and the second downlink component carrier; and
a transmitter, which, in operation, transmits uplink data on the uplink component carrier in accordance with the uplink resource allocation information, wherein,
the receiver, in operation, receives an Acknowledgement/Negative-acknowledgement (ACK/NACK) signal for the uplink data in a physical hybrid-ARQ indicator channel (PHICH) only on said one downlink component carrier on which the uplink resource allocation information is received, and a resource of the PHICH is determined based on the uplink resource allocation information.

2. The communication apparatus according to claim 1, wherein a channel, in which the first and second downlink resource allocation information are received, is different from the PHICH.

3. The communication apparatus according to claim 1, wherein a channel, in which the first and second downlink resource allocation information are received, is a physical downlink control channel (PDCCH).

4. The communication apparatus according to claim 1, wherein a number of uplink component carriers is equal to a number of downlink component carriers.

5. The communication apparatus according to claim 1, wherein a number of uplink component carriers is less than a number of downlink component carriers.

6. The communication apparatus according to claim 1, wherein the first downlink component carrier is a downlink semi-reference component carrier used to broadcast information regarding the uplink component carrier.

7. The communication apparatus according to claim 1, wherein a bandwidth of the first downlink component carrier and a bandwidth of the second downlink component carrier are set independently from each other.

8. The communication apparatus according to claim 1, wherein the second downlink component carrier is set only for an LTE-advanced user equipment.

9. The communication apparatus of claim 1 wherein, the receiver, in operation, receives the uplink resource allocation information for the uplink component carrier on only one out of the first downlink component carrier and the second downlink component carrier.

10. The communication apparatus of claim 1 wherein,
the receiver, in operation, receives third downlink resource allocation information for a third downlink component carrier and receives uplink resource allocation information for first and second uplink component carriers on the one downlink component carrier out of the first downlink component carrier and the second downlink component carrier; and
the transmitter, in operation, transmits the uplink data on the first and second uplink component carriers in accordance with the uplink resource allocation information.

11. A communication method comprising:
receiving first downlink resource allocation information for a first downlink component carrier;
receiving second downlink resource allocation information for a second downlink component carrier, which is different from the first downlink component carrier;
receiving first downlink data on the first downlink component carrier in accordance with the first downlink resource allocation information;
receiving second downlink data on the second downlink component carrier in accordance with the second downlink resource allocation information;
receiving uplink resource allocation information for an uplink component carrier on one downlink component carrier out of the first downlink component carrier and the second downlink component carrier;
transmitting uplink data on the uplink component carriers in accordance with the uplink resource allocation information; and
receiving an Acknowledgement/Negative-acknowledgement (ACK/NACK) signal for the uplink data in a physical hybrid-ARQ indicator channel (PHICH) only on said one downlink component carrier on which the uplink resource allocation information is received, the resource of the PHICH being determined based on the uplink resource allocation information.

12. The communication method according to claim 11, wherein a channel, in which the first and second downlink resource allocation information are received, is different from the PHICH.

13. The communication method according to claim 11, wherein a channel, in which the first and second downlink resource allocation information are received, is a physical downlink control channel (PDCCH).

14. The communication method according to claim 11, wherein a number of uplink component carriers is equal to a number of downlink component carriers.

15. The communication method according to claim 11, wherein a number of uplink component carriers is less than a number of downlink component carriers.

16. The communication method according to claim 11, wherein the first downlink component carrier is a downlink semi-reference component carrier used to broadcast information regarding the uplink component carrier.

17. The communication method according to claim 11, wherein a bandwidth of the first downlink component carrier and a bandwidth of the second downlink component carrier are set independently from each other.

18. The communication method according to claim 11, wherein the second downlink component carrier is set only for an LTE-advanced user equipment.

19. The communication method of claim 11, wherein, the uplink resource allocation information for the uplink component carrier is received on only one out of the first downlink component carrier and the second downlink component carrier.

20. The communication method of claim 11, comprising:
  receiving third downlink resource allocation information for a third downlink component carrier, wherein,
  the receiving uplink resource allocation information comprises receiving uplink resource allocation information for first and second uplink component carriers on the one downlink component carrier out of the first downlink component carrier and the second downlink component carrier; and
  the transmitting the uplink data comprises transmitting uplink data on the first and second uplink component carriers in accordance with the uplink resource allocation information.

* * * * *